(12) United States Patent
Jin et al.

(10) Patent No.: US 10,942,660 B2
(45) Date of Patent: Mar. 9, 2021

(54) MEMORY SYSTEM FOR PEFORMING COMPRESSION BASED ON MAP DATA PATTERN AND OPERATING METHOD THEREOF

(71) Applicant: SK hynix Inc., Gyeonggi-do (KR)

(72) Inventors: Yong Jin, Seoul (KR); Seung-Geol Baek, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 110 days.

(21) Appl. No.: 16/178,118

(22) Filed: Nov. 1, 2018

(65) Prior Publication Data
US 2019/0324644 A1 Oct. 24, 2019

(30) Foreign Application Priority Data

Apr. 24, 2018 (KR) .................. 10-2018-0047292

(51) Int. Cl.
*G06F 3/06* (2006.01)

(52) U.S. Cl.
CPC ............ *G06F 3/064* (2013.01); *G06F 3/0608* (2013.01); *G06F 3/0679* (2013.01)

(58) Field of Classification Search
CPC ............. G06F 3/0608; G06F 2212/401; G06F 16/1744; G06F 2212/1044; G06F 3/064; G06F 3/0679
USPC ................ 711/154, 103, 202, 170, E12.001, 711/E12.008, E12.014
See application file for complete search history.

(56) References Cited

U.S. PATENT DOCUMENTS

| | | | |
|---|---|---|---|
| 8,826,092 B2 * | 9/2014 | Berry, Jr. ............... | G06F 11/349 714/738 |
| 9,229,876 B2 | 1/2016 | Slepon | |
| 9,406,401 B2 * | 8/2016 | Lo .......................... | G11C 29/40 |
| 10,382,751 B1 * | 8/2019 | Zhao .................... | H04N 19/105 |
| 2008/0301256 A1 * | 12/2008 | McWilliams ....... | G06F 12/0806 709/214 |
| 2017/0139773 A1 | 5/2017 | Kang et al. | |
| 2017/0160948 A1 * | 6/2017 | Rueger ................. | G06F 3/0661 |

FOREIGN PATENT DOCUMENTS

| KR | 1020110093258 | 8/2011 |
|---|---|---|
| KR | 1020130030640 | 3/2013 |
| KR | 101453313 | 10/2014 |

\* cited by examiner

*Primary Examiner* — Tuan V Thai
*Assistant Examiner* — Edward Waddy, Jr.
(74) *Attorney, Agent, or Firm* — IP & T Group LLP

(57) ABSTRACT

A memory system includes a memory device including dies, each of the dies including planes, each of the planes including blocks, each of the blocks including pages; and a controller suitable for controlling the memory device, the controller comprising: a memory including a mapping table which includes map chunks generated through dividing map data into map chunks each of a unit size; a pattern determination engine suitable for determining patterns with respect to each of the map chunks received from the memory; and a compression engine suitable for determining whether to perform compression on the map chunks, based on pattern determination results for the map chunks determined by the pattern determination engine, and performing compression on those map chunks for which performing compression was determined.

10 Claims, 13 Drawing Sheets

FIG. 8

| | | |
|---|---|---|
| MT | | |
| Segment_1 (S<1>) | Map Chunk_1 | — MC<1> |
| | Map Chunk_2 | — MC<2> |
| | Map Chunk_3 | — MC<3> |
| Segment_2 (S<2>) | Map Chunk_4 | — MC<4> |
| | Map Chunk_5 | — MC<5> |
| | Map Chunk_6 | — MC<6> |
| Segment_3 (S<3>) | Map Chunk_7 | — MC<7> |
| | Map Chunk_8 | — MC<8> |
| | Map Chunk_9 | — MC<9> |

FIG. 9

CMT

| Map Chunk Count(M) | Compress Map Chunk List | | |
|---|---|---|---|
| 1 | IC_Map Chunk_1 | | — IC_MC<1> |
| 2 | C_Map Chunk_2 | C_Map Chunk_3 | — C_MC<3> |
| 1 | C_Map Chunk_4 | Dummy | |
| 1 | IC_Map Chunk_5 | | — IC_MC<5> |
| 3 | C_Map Chunk_6 | C_Map Chunk_7 | C_Map Chunk_8 — C_MC<8> |
| 1 | IC_Map Chunk_9 | | — IC_MC<9> |

C_MC<2>, C_MC<4>, C_MC<6>, C_MC<7>

MEMORY SYSTEM FOR PEFORMING COMPRESSION BASED ON MAP DATA PATTERN AND OPERATING METHOD THEREOF

CROSS-REFERENCE TO RELATED APPLICATION

This application claims priority under 35 U.S.C. § 119(a) to Korean Patent Application No. 10-2018-0047292, filed on Apr. 24, 2018, which is incorporated herein by reference in its entirety.

BACKGROUND

1. Field

Various embodiments relate to a semiconductor device, and more particularly, to a memory system and an operating method thereof.

2. Discussion of the Related Art

Recently, the paradigm for the computer environment has shifted to ubiquitous computing systems that can be used anytime and anywhere. Due to this fact, the use of portable electronic devices such as mobile phones, digital cameras, and notebook computers has rapidly increased. In general, such portable electronic devices use a memory system which uses a memory device, that is, a data storage device. The data storage device is used as a main memory device or an auxiliary memory device of the portable electronic devices.

A data storage device using a memory device provides advantages in that, since there is no mechanical driving part, stability and durability are excellent, an information access speed is high and power consumption is small. Data storage devices having such advantages include a universal serial bus (USB) memory device, memory cards having various interfaces, and a solid state drive (SSD).

SUMMARY

Various embodiments are directed to a memory system capable of compressing map data without a degradation of operational performance and an operating method thereof.

In an embodiment, a memory system may include: a memory device including dies, each of the dies including planes, each of the planes including blocks, each of the blocks including pages; and a controller suitable for controlling the memory device, the controller comprising: a memory including a mapping table which includes map chunks generated through dividing map data into map chunks each of a unit size; a pattern determination engine suitable for determining patterns with respect to each of the map chunks received from the memory; and a compression engine suitable for determining whether to perform compression on the map chunks, based on pattern determination results for the map chunks determined by the pattern determination engine, and performing compression on those map chunks for which performing compression was determined.

The compression engine may comprise a compression performance determination circuit suitable for determining whether to perform compression on the map chunks, based on the pattern determination results; and a compression performance circuit suitable for performing compression by applying different compression rates to different map chunks as determined by the compression performance determination circuit.

The pattern determination engine may determine whether map data stored in each of the map chunks correspond to random data, sequential data or an empty region.

The compression performance circuit may don't compress each map chunk which data corresponds to random data, compresses each map chunk which data corresponds to sequential data at a first compression rate, and compresses each map chunk which data corresponds to an empty region at a second compression rate.

The memory device may include a mapping table.

The mapping table may include each map chunk and indication as to whether it was compressed or not.

The mapping table may be constructed for pages of the memory device that form a super page, and includes a compress map chunk list and a map chunk count field, wherein, for each page of the super page, the compress map chunk list includes at least one compressed map chunk or uncompressed map chunk and the map chunk count field includes a map chunk count which indicates a count of compressed map chunks and uncompressed map chunks for the corresponding page.

In an embodiment, a method for operating a memory system including a memory device including dies, each of the dies including planes, each of the planes including blocks, each of the blocks including pages, and a controller which controls the memory device, the method comprising: determining patterns with respect to each of a plurality of map chunks in a mapping table; determining whether to perform compression on the map chunks based on pattern determination results for the map chunks; and selectively performing compression on the map chunks based on compression determination results.

Map data may be divided into the chunks, each of which is of a unit size.

The determining of the patterns with respect to each of map chunks may comprise: determining patterns with respect to whether map data of each of the map chunks corresponds to random data, sequential data or an empty region.

The selectively performing compression on the map chunks may comprise: not compressing each map chunk which data corresponds to random data; and compressing each map chunk which data corresponds to sequential data at a first compression rate and compressing each map chunk which data corresponds to an empty region at a second compression rate.

The memory device may include a mapping table.

The mapping table may include each map chunk and whether it was compressed or not.

The mapping table may be constructed for pages of the memory device that form a super page, and includes a compress map chunk list and a map chunk count field, wherein, for each page of the super page the compress map chunk list includes at least one compressed map chunk or uncompressed map chunk and the map chunk count filed includes a map chunk count which indicates a count of compressed map chunks and uncompressed map chunks stored for the corresponding page.

In an embodiment, a memory system may include: a memory device; and a controller suitable for: dividing map data into chunks, each having a set size; detecting a pattern for map data in each of the chunks; determining whether to compress each chunk based on the detected pattern for the map data of that chunk; determining a compression rate for each chunk for which it was determined to compress; compressing each chunk for which it was determined to compress at the compression rate determined for that chunk; and controlling the memory device to store the compressed chunks of map data.

BRIEF DESCRIPTION OF THE DRAWINGS

FIG. 8 is a diagram illustrating a mapping table included in a memory in accordance with an embodiment of the present disclosure.

FIG. 9 is a diagram illustrating a compressed mapping table included in a memory device in accordance with an embodiment of the present disclosure.

DETAILED DESCRIPTION

Figure 1:
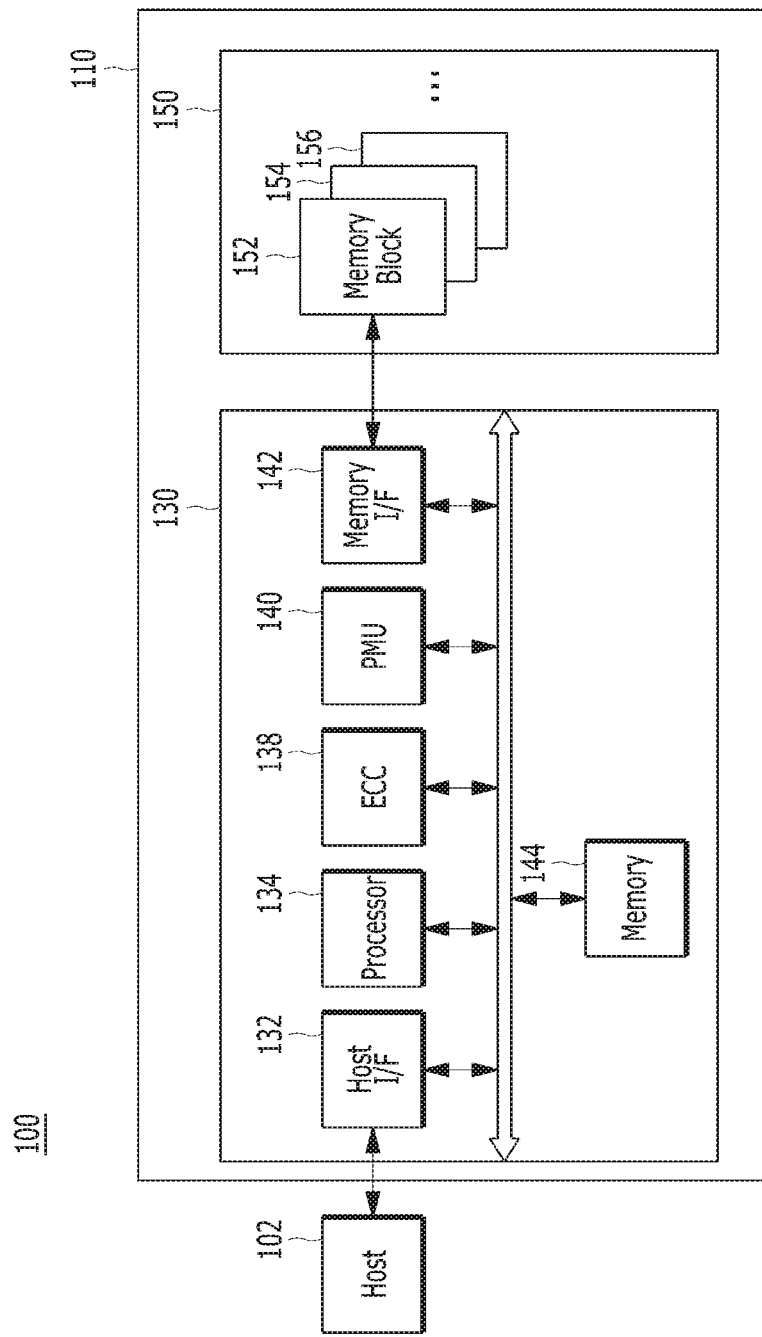
FIG. 1 is a block diagram schematically illustrating a data processing system including a memory system in accordance with an embodiment.

Various embodiments will be described below in more detail with reference to the accompanying drawings. The present invention may, however, be embodied in different forms and thus the present invention is not limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention. Also, throughout the specification, reference to "an embodiment," "another embodiment" or the like is not necessarily to only one embodiment, and different references to any such phrase are not necessarily to the same embodiment(s).

FIG. 1 is a block diagram illustrating a data processing system 100 including a memory system in accordance with an embodiment.

Referring to FIG. 1, the data processing system 100 may include a host 102 and a memory system 110.

The host 102 includes electronic devices, for example, portable electronic devices such as a mobile phone, an MP3 player and a laptop computer or electronic devices such as a desktop computer, a game machine, a television (TV) and a projector, that is, wired and wireless electronic devices.

Also, the host 102 includes at least one operating system (OS). The operating system generally manages and controls the functions and operations of the host 102, and provides interoperability between the host 102 and a user using the data processing system 100 or the memory system 110. The operating system supports functions and operations corresponding to the user's purpose of use and the use of the operating system. For example, the operating system may be a general operating system or a mobile operating system depending on the mobility of the host 102. The general operating system may be a personal operating system or an enterprise operating system depending on the user's usage environment. For example, the personal operating system configured to support a service providing function for a general user may include windows and chrome, and the enterprise operating system configured to secure and support high performance may include windows server, linux and unix. The mobile operating system configured to support a mobility service providing function and a system power saving function to users may include Android, iOS, Windows mobile, etc. The host 102 may include a plurality of operating systems, and executes the operating systems to perform operations with the memory system 110 in correspondence to a user request. The host 102 transmits a plurality of commands corresponding to a user request to the memory system 110, and accordingly, the memory system 110 performs operations corresponding to the commands, that is, operations corresponding to the user request.

The memory system 110 operates in response to a request of the host 102, and, in particular, stores data to be accessed by the host 102. In other words, the memory system 110 may be used as a main memory device or an auxiliary memory device of the host 102. The memory system 110 may be implemented as any one of various kinds of storage devices, depending on a host interface protocol which is coupled with the host 102. For example, the memory system 110 may be implemented as any one of a solid state driver (SSD), a multimedia card (e.g., an MMC, an embedded MMC (eMMC), a reduced size MMC (RS-MMC) and a micro-MMC), a secure digital card (e.g., an SD, a mini-SD and a micro-SD), a universal serial bus (USB) storage device, a universal flash storage (UFS) device, a compact flash (CF) card, a smart media card, and a memory stick.

The storage devices which implement the memory system 110 may be a volatile memory device such as a dynamic random access memory (DRAM) and/or a static random access memory (SRAM) or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM) and/or a resistive RAM (RRAM).

The memory system 110 includes a memory device 150 which stores data to be accessed by the host 102, and a controller 130 which controls storage of data in the memory device 150.

The controller 130 and the memory device 150 may be integrated into one semiconductor device. For instance, the controller 130 and the memory device 150 may be integrated into one semiconductor device and configure a solid state drive (SSD). In the case where the memory system 110 is used as an SSD, the operating speed of the host 102 which is coupled to the memory system 110 may be improved. The controller 130 and the memory device 150 may be integrated into one semiconductor device to form a memory card such as a personal computer memory card international association (PCMCIA) card, a compact flash (CF) card, a smart media card (e.g., an SM and an SMC), a memory stick, a multimedia card (e.g., an MMC, an RS-MMC and a micro-MMC), a secure digital card (e.g., an SD, a mini-SD, a micro-SD and an SDHC), and/or a universal flash storage (UFS) device.

In another embodiment, the memory system 110 may be disposed in a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various component elements configuring a computing system.

The memory device 150 may retain stored data even though power is not supplied. In particular, the memory device 150 stores the data provided from the host 102 through a write operation, and provides stored data to the host 102 through a read operation. The memory device 150 includes a plurality of memory blocks 152, 154 and 156, each of which includes a plurality of pages. Each of the pages includes a plurality of memory cells to which a plurality of word lines (WL) are coupled. Also, the memory device 150 includes a plurality of planes, each of which includes a plurality of memory blocks, e.g., blocks 152, 154 and 156. In particular, the memory device 150 may include a plurality of memory dies, each of which includes a plurality of planes. The memory device 150 may be a nonvolatile memory device, for example, a flash memory. The flash memory may have a three-dimensional (3D) stack structure.

Detailed description of the structure of the memory device 150 including the 3D stack structure is given below with reference to FIGS. 2 to 4.

The controller 130 controls the memory device 150 in response to a request from the host 102. For example, the controller 130 provides the data read from the memory device 150, to the host 102, and stores the data provided from the host 102, in the memory device 150. To this end, the controller 130 controls the operations of the memory device 150, such as read, write, program and erase operations.

The controller 130 includes a host interface (I/F) 132, a processor 134, an error correction code (ECC) component 138, a power management unit (PMU) 140, a memory interface (I/F) 142 and a memory 144.

The host interface 132 processes the commands and data of the host 102, and may be configured to communicate with the host 102 through at least one of various interface protocols such as universal serial bus (USB), multimedia card (MMC), peripheral component interconnect express (PCI-e or PCIe), serial attached SCSI (SAS), serial advanced technology attachment (SATA), parallel advanced technology attachment (PATA), small computer system interface (SCSI), enhanced small disk interface (ESDI), integrated drive electronics (IDE) and mobile industry processor interface (MIPI). The host interface 32 may be driven through a firmware referred to as a host interface layer (HIL) being a region which exchanges data with the host 102.

The ECC component 138 corrects an error bit of the data processed in the memory device 150, and may include an ECC encoder and an ECC decoder. The ECC encoder may encode data to be programmed in the memory device 150 and generate data added with parity bits. The data added with parity bits may be stored in the memory device 150. The ECC decoder detects and corrects an error included in the data read from the memory device 150, in the case of reading the data stored in the memory device 150. That is to say, after performing error correction decoding for the data read from the memory device 150, the ECC component 138 may determine whether the error correction decoding has succeeded, output an indication signal depending on a determination result, for example, an error correction success/failure signal, and correct an error bit of the read data by using the parity bits generated in the ECC encoding process. The ECC component 138 may be unable to correct error bits when error bits occur above a correctable error bit limit, and may output an error correction fail signal corresponding to the incapability of correcting error bits.

The ECC component 138 may perform error correction by using, but not limited to, a low density parity check (LDPC) code, a Bose, Chaudhuri, Hocquenghem (BCH) code, a turbo code, a Reed-Solomon (RS) code, a convolution code, a recursive systematic code (RSC), trellis-coded modulation (TCM) or Block coded modulation (BCM). The ECC component 138 may include a circuit, module, system or device for error correction.

The PMU 140 provides and manages power for the controller 130, that is, power for the component elements included in the controller 130.

The memory interface 142 serves as a memory and storage interface which performs interfacing between the controller 130 and the memory device 150, to allow the controller 130 to control the memory device 150 in response to a request from the host 102. The memory interface 142 generates control signals for the memory device 150 and processes data according to the control of the processor 134, as a NAND flash controller (NFC) in the case where the memory device 150 is a flash memory, in particular, in the case where the memory device 150 is a NAND flash memory. The memory interface 142 may support the operation of an interface which processes a command and data between the controller 130 and the memory device 150, for example, a NAND flash interface, in particular, data input/output between the controller 130 and the memory device 150. The memory interface 142 may be driven through a firmware referred to as a flash interface layer (FIL) being a region which exchanges data with the memory device 150.

The memory 144, as the working memory of the memory system 110 and the controller 130, stores data for driving of the memory system 110 and the controller 130. For example, when the controller 130 controls the memory device 150 in response to a request from the host 102, the controller 130 may provide data read from the memory device 150 to the host 102, and/or store data provided from the host 102 in the memory device 150. To this end, when the controller 130 controls the operations of the memory device 150, such as read, write, program and erase operations, the memory 144 stores data needed to allow such operations to be performed by the memory system 110, that is, between the controller 130 and the memory device 150.

The memory 144 may be realized by a volatile memory. For example, the memory 144 may be realized by a static random access memory (SRAM) or a dynamic random access memory (DRAM). Furthermore, the memory 144 may disposed within the controller 130 as shown in FIG. 1. Alternatively, the memory 144 may external to the controller 130, and in this regard, may be realized as a separate external volatile memory in communication with the controller 130 through a memory interface.

As described above, the memory 144 stores data needed to perform data read and write operations between the host 102 and the memory device 150 and data when performing the data read and write operations. For such data storage, the memory 144 includes a program memory, a data memory, a write buffer/cache, a read buffer/cache, a data buffer/cache, a map buffer/cache, and the like.

The processor 134 controls the entire operations of the memory system 110, and in particular, controls a program operation or a read operation for the memory device 150, in response to a write request or a read request from the host 102. The processor 134 drives a firmware referred to as a flash translation layer (FTL), to control the general operations of the memory system 110. The processor 134 may be realized by a microprocessor or a central processing unit (CPU).

For instance, the controller 130 performs an operation requested from the host 102, in the memory device 150, that is, performs a command operation corresponding to a command received from the host 102, with the memory device 150, through the processor 134 embodied by a microprocessor or a central processing unit (CPU). The controller 130 may perform a foreground operation as a command operation corresponding to a command received from the host 102, for example, a program operation corresponding to a write command, a read operation corresponding to a read command, an erase operation corresponding to an erase command or a parameter set operation corresponding to a set parameter command or a set feature command as a set command.

The controller 130 may also perform a background operation for the memory device 150, through the processor 134 embodied by a microprocessor or a central processing unit (CPU). The background operation for the memory device 150 includes an operation of copying the data stored in one memory block, among the memory blocks 152, 154 and 156 of the memory device 150, to another memory block. Such a background operation may be a garbage collection (GC) operation, an operation of swapping the memory blocks 152, 154 and 156 or data stored therein, e.g., a wear leveling (WL) operation, an operation of storing map data stored in the controller 130 in the memory blocks 152, 154 and 156, e.g., a map flush operation, or an operation of performing bad block management for the memory device 150, for example, an operation of identifying and processing a bad block among the memory blocks 152, 154 and 156 in the memory device 150.

A management unit (not shown) for performing bad block management for the memory device 150 may be included in the processor 134 of the controller 130. The management unit identifies a bad block in the plurality of memory blocks 152, 154 and 156 in the memory device 150, and then, performs bad block management of processing the bad block and labeling it as bad. The bad block management, in the case where the memory device 150 is a flash memory, for example, a NAND flash memory, is used when a program fail may occur when performing data write, for example, data program, due to the characteristic of the NAND flash memory. A memory block where the program fail has occurred is processed and labeled as a bad block, and program-failed data are written, that is, programmed, in a new memory block. Moreover, in the case where the memory device 150 has a 3-dimensional stack structure as described above, if a corresponding block is processed as a bad block according to a program fail, because the utilization efficiency of the memory device 150 and the reliability of the memory system 110 may deteriorate abruptly, it is necessary to reliably perform bad block management. A memory device in the memory system in accordance with embodiments of the present disclosure is described below in detail with reference to FIGS. 2 to 4.

Figure 2:
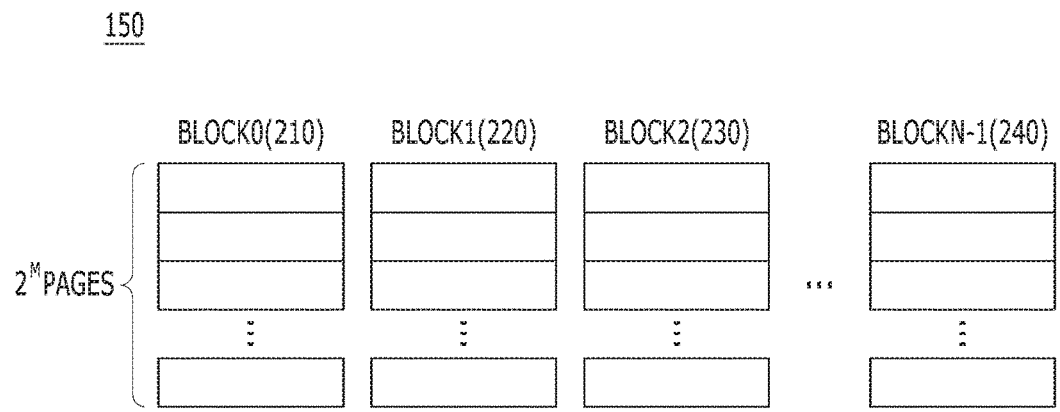
FIG. 2 is a diagram schematically illustrating a memory device in a memory system in accordance with an embodiment.
Figure 3:
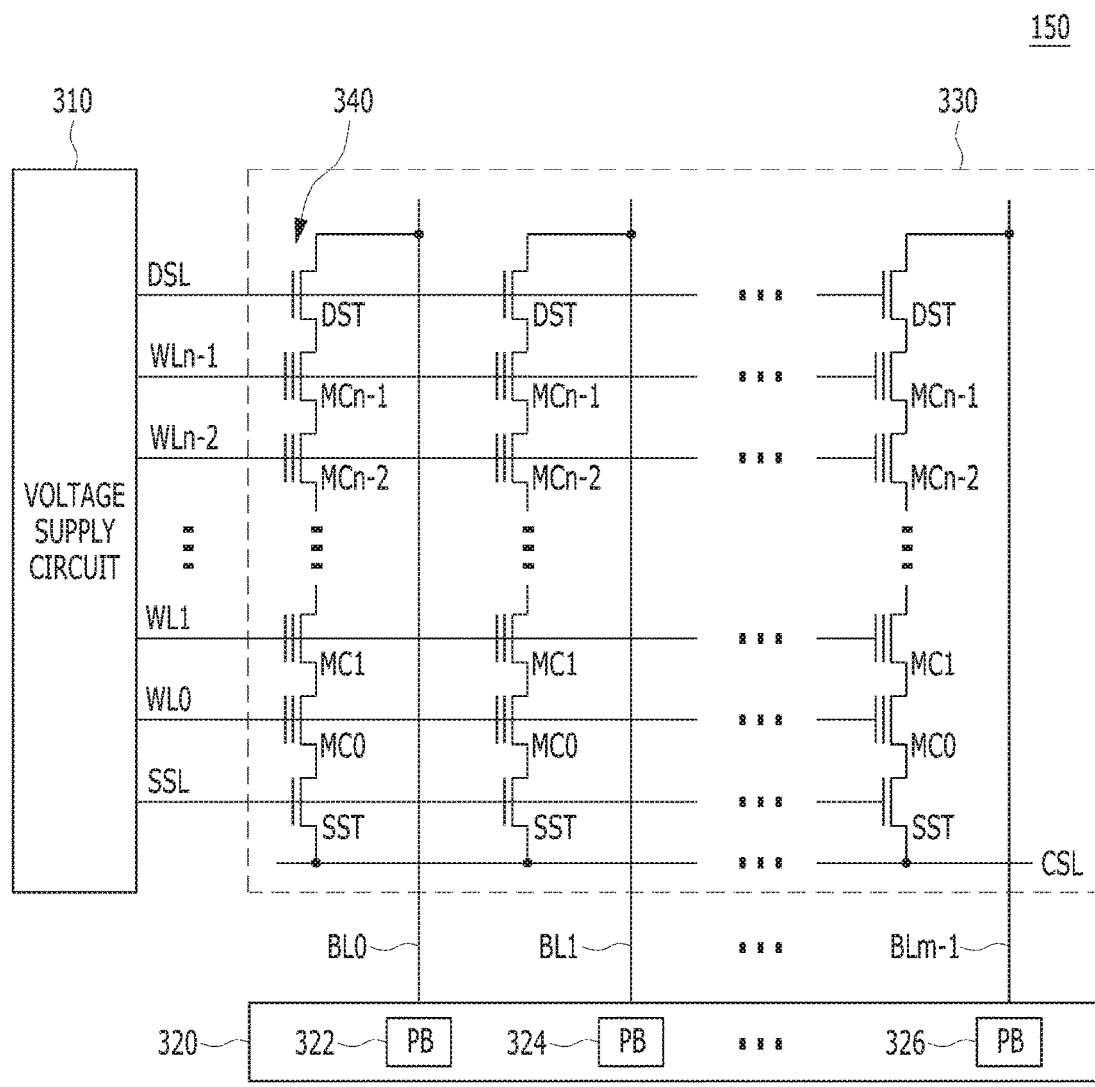
FIG. 3 is a diagram schematically illustrating a memory cell array circuit of a memory block in a memory device in accordance with an embodiment.
Figure 4:
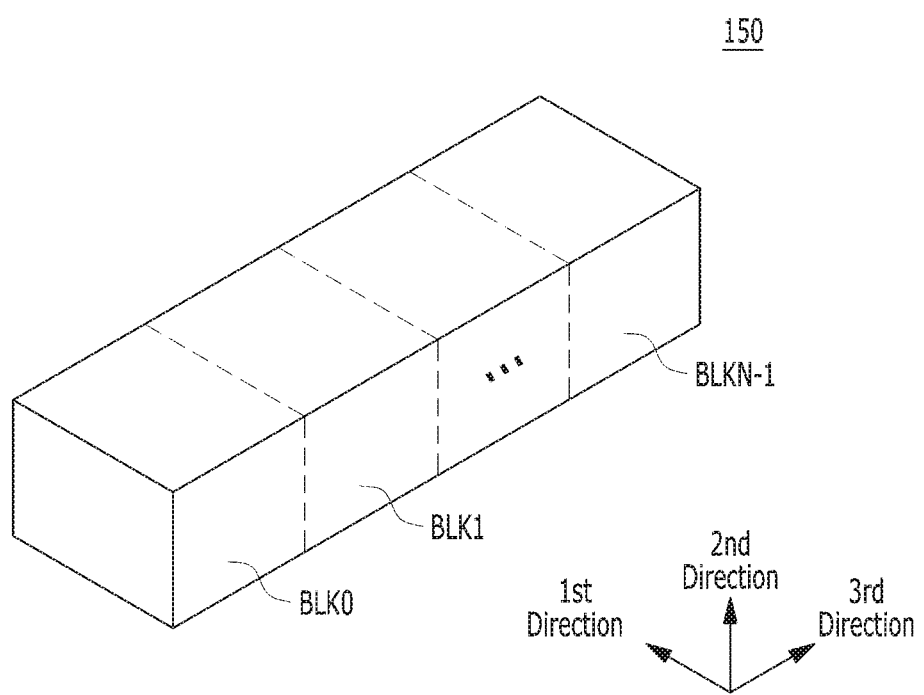
FIG. 4 is a diagram schematically illustrating a memory device in a memory system in accordance with an embodiment.

FIG. 2 is a diagram illustrating a memory device in a memory system, FIG. 3 is a diagram illustrating a memory cell array circuit of a memory block in a memory device, and FIG. 4 is a diagram illustrating a structure of a 3-dimensional nonvolatile memory device.

Referring to FIG. 2, the memory device 150 includes a plurality of memory blocks, for example, a zeroth block (BLOCK0) 210, a first block (BLOCK1) 220, a second block (BLOCK2) 230 and an (N-1)th block (BLOCKN-1) 240. Each of the blocks 210, 220, 230 and 240 includes a plurality of pages, for example, $2^M$ or M pages. Each of the pages includes a plurality of memory cells to which a plurality of word lines (WL) are coupled.

The memory device 150 may include single level cell (SLC) memory blocks and/or multi-level cell (MLC) memory blocks, depending on the number of bits to be stored in or expressed by one memory cell. An SLC memory block includes a plurality of pages which are realized by memory cells each storing 1 bit, and has high data calculation performance and high durability. An MLC memory block includes a plurality of pages which are realized by memory cells each storing multi-bit data (for example, 2 or more bits), and has a larger data storage space than the SLC memory block, that is, is capable of being highly integrated. In particular, the memory device 150 may include, as MLC memory blocks, an MLC memory block including a plurality of pages which are realized by memory cells each capable of storing 2-bit data, a triple level cell (TLC) memory block including a plurality of pages which are realized by memory cells each capable of storing 3-bit data, a quadruple level cell (QLC) memory block including a plurality of pages which are realized by memory cells each capable of storing 4-bit data, or a multiple level cell memory block including pages which are realized by memory cells each capable of storing 5 or more-bit data.

While it is described as an example that the memory device 150 is realized by a nonvolatile memory such as a flash memory, for example, a NAND flash memory, it is noted that the memory device 150 may be implemented as any of multiple types of memories such as a phase change memory (i.e., phase change random access memory (PCRAM)), a resistive memory (i.e., resistive random access memory (RRAM or ReRAM)), a ferroelectric memory (i.e., ferroelectric random access memory (FRAM)) and a spin transfer torque magnetic memory (i.e., spin transfer torque magnetic random access memory (STT-RAM or STT-MRAM)).

Each of the memory blocks 210, 220, 230 and 240 stores the data provided from the host 102 of FIG. 1, through a write operation, and provides stored data to the host 102, through a read operation.

Referring to FIG. 3, among the plurality of memory blocks 152, 154 and 156 in the memory device 150 of the memory system 110, each memory block 330 may include a plurality of cell strings 340 which are realized as a memory cell array and are coupled to bit lines BL0 to BLm-1, respectively. The cell string 340 of each column may include at least one drain select transistor DST and at least one source select transistor SST. A plurality of memory cells or memory cell transistors MC0 to MCn−1 may be coupled in series between the select transistors SST and DST. The respective memory cells MC0 to MCn−1 may be constructed by multi-level cells (MLC) each of which stores data or information of a plurality of bits. The cell strings 340 may be electrically coupled to corresponding bit lines BL0 to BLm−1, respectively.

While FIG. 3 shows, as an example, each memory block 330 constructed by NAND flash memory cells, it is noted that each of the plurality of memory blocks 152,154,156 is not limited to a NAND flash memory and may be realized by a NOR flash memory, a hybrid flash memory in which at least two kinds of memory cells are combined, or a one-NAND flash memory in which a controller is built in a memory chip. The memory device 150 may be realized as not only a flash memory device in which a charge storing layer is constructed by conductive floating gates but also a charge trap flash (CTF) memory device in which a charge storage layer is constructed by a dielectric layer.

A voltage supply circuit 310 of the memory device 150 may provide word line voltages (for example, a program voltage, a read voltage and a pass voltage) to be supplied to respective word lines according to an operation mode and voltages to be supplied to bulks (for example, well regions) formed with memory cells. The voltage generating operation of the voltage supply circuit 310 may be performed by the control of a control circuit (not shown). The voltage supply circuit 310 may generate a plurality of variable read voltages to generate a plurality of read data, select one of the memory blocks (or sectors) of a memory cell array in response to the control of the control circuit, select one of the word lines of the selected memory block, and provide the word line voltages to the selected word line and unselected word lines.

A read/write circuit 320 of the memory device 150 is controlled by a control circuit (not shown), and may operate as a sense amplifier or a write driver according to an operation mode. In a verify/normal read operation, the read/write circuit 320 may operate as a sense amplifier for reading data from the memory cell array. In a program operation, the read/write circuit 320 may operate as a write driver which drives bit lines according to data to be stored in the memory cell array. In the program operation, the read/write circuit 320 may receive data to be written in the memory cell array, from a buffer (not shown), and may drive the bit lines according to inputted data. To this end, the read/write circuit 320 may include a plurality of page buffers (PB) 322, 324 and 326 respectively corresponding to columns (or bit lines) or pairs of columns (or pairs of bit lines), and a plurality of latches (not shown) may be included in each of the page buffers 322, 324 and 326.

The memory device 150 may be realized as a 2-dimensional or 3-dimensional memory device. In particular, as shown in FIG. 4, the memory device 150 may be realized as a nonvolatile memory device with a three-dimensional stack structure. In the case where the memory device 150 is realized as a three-dimensional structure, the memory device 150 may include a plurality of memory blocks BLK0 to BLKN−1. FIG. 4 illustrates the memory blocks 152, 154 and 156 of the memory device 150 shown in FIG. 1. Each of the memory blocks 152, 154 and 156 may be realized as a 3-dimensional structure (or a vertical structure). For example, the respective memory blocks 152, 154 and 156 may be realized as a 3-dimensional structure which extends in first to third directions, for example, the x-axis direction, the y-axis direction and the z-axis direction.

Each memory block 330 may include a plurality of NAND strings NS which extend in the second direction. The plurality of NAND strings NS may be provided in the first direction and the third direction. Each NAND string NS may be coupled to a bit line BL, at least one string select line SSL, at least one ground select line GSL, a plurality of word lines WL, at least one dummy word line DWL and a common source line CSL, and may include a plurality of transistor structures TS.

Namely, among the plurality of memory blocks 152, 154 and 156 of the memory device 150, each memory block 330 may be coupled to a plurality of bit lines BL, a plurality of string select lines SSL, a plurality of ground select lines GSL, a plurality of word lines WL, a plurality of dummy word lines DWL and a plurality of common source lines CSL, and accordingly, may include a plurality of NAND strings NS. Also, in each memory block 330, a plurality of NAND strings NS may be coupled to one bit line BL, and a plurality of transistors may be realized in one NAND string NS. A string select transistor SST of each NAND string NS may be coupled to a corresponding bit line BL, and a ground select transistor GST of each NAND string NS may be coupled to the common source line CSL. Memory cells MC may be provided between the string select transistor SST and the ground select transistor GST of each NAND string NS. Namely, in the plurality of memory blocks 152, 154 and 156 of the memory device 150, a plurality of memory cells may be realized in each memory block 330.

Figure 5:
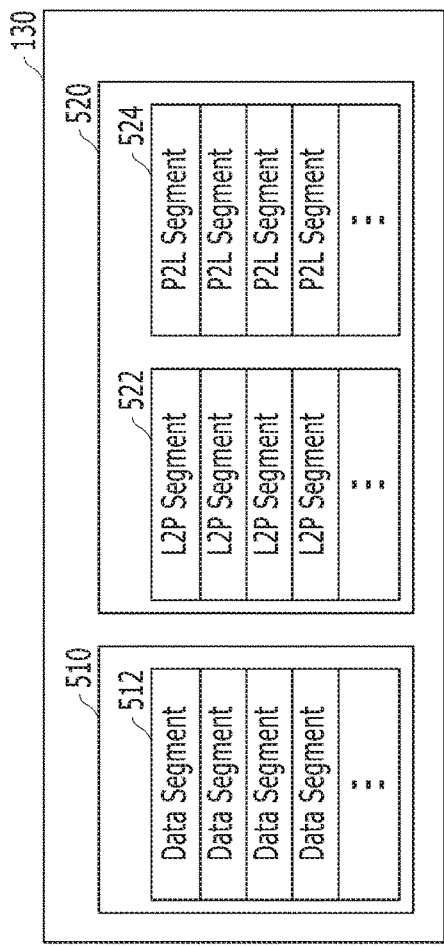
FIG. 5 a diagram illustrating a data processing operation with respect to a memory device in a memory system in accordance with an embodiment.
Figure 5:
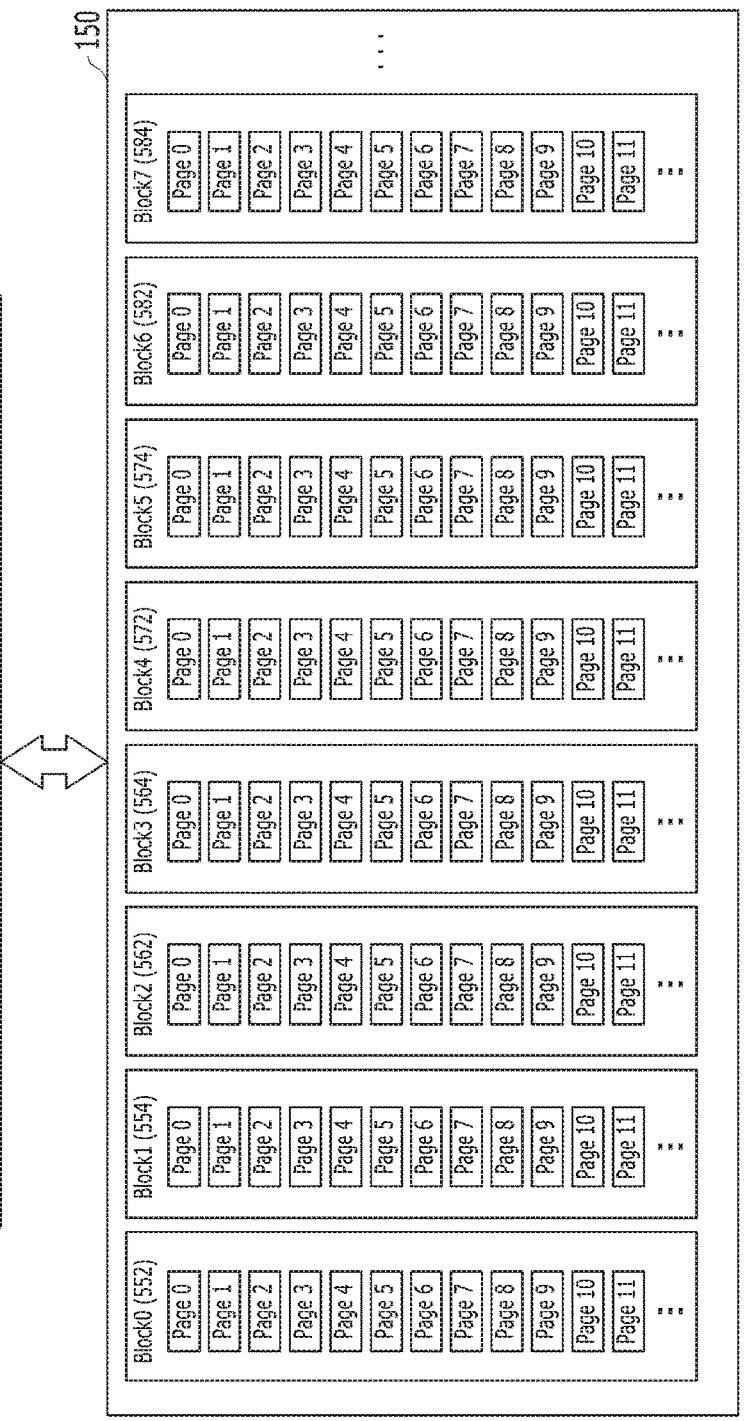

FIG. 5 is a diagram illustrating a data processing operation with respect to a memory device in a memory system in accordance with an embodiment.

Referring to FIG. 5, the controller 130 performs a command operation corresponding to a command received from the host 102, for example, a program operation corresponding to a program command. The controller 130 programs and stores user data corresponding to the program command in the plurality of pages in memory blocks 552, 554, 562, 564, 572, 574, 582 and 584 of the memory device 150.

The controller 130 generates and updates metadata for the user data, and programs and stores the metadata in the memory blocks 552, 554, 562, 564, 572, 574, 582 and 584 of the memory device 150. The metadata include logical to physical (logical/physical or L2P) information and physical to logical (physical/logical or P2L) information for the user data stored in the memory blocks 552, 554, 562, 564, 572, 574, 582 and 584. Also, the metadata may include information on command data corresponding to a command received from the host 102, information on a command operation corresponding to the command, information on the memory blocks of the memory device 150 for which the command operation is to be performed, and information on map data corresponding to the command operation. In other words, metadata may include all information and data, excluding user data, corresponding to a command received from the host 102.

For example, the controller 130 caches and buffers user data corresponding to a program command received from the host 102, in a first buffer 510 of the controller 130. That is, the controller 130 stores data segments 512 of the user data in the first buffer 510 as a data buffer/cache. The first buffer 510 may be included in the memory 144 of the controller 130. Thereafter, the controller 130 programs and stores the data segments 512 stored in the first buffer 510, in the pages included in the memory blocks 552, 554, 562, 564, 572, 574, 582 and 584 of the memory device 150.

As the data segments 512 of the user data are programmed and stored in the pages in the memory blocks 552, 554, 562, 564, 572, 574, 582 and 584, the controller 130 generates L2P segments 522 and P2L segments 524 as metadata. Then, the controller 130 stores the L2P segments 522 and the P2L segments 524 in a second buffer 520 of the controller 130. The second buffer 520 may be included in the memory 144 of the controller 130. In the second buffer 520, the L2P segments 522 and the P2L segments 524 may be stored in the form of a list. Then, the controller 130 programs and stores the L2P segments 522 and the P2L segments 524 in the pages in the memory blocks 552, 554, 562, 564, 572, 574, 582 and 584 through a map flush operation.

The controller 130 performs a command operation corresponding to a command received from the host 102. For example, the controller 130 performs a read operation corresponding to a read command. The controller 130 checks L2P segments 522 and P2L segments 524 of user data corresponding to the read command by loading them in the second buffer 520. Then, the controller 130 reads data segments 512 of the user data from a storage position known through the checking. That is, the controller 130 reads the data segments 512 from a specific page of a specific memory block among the memory blocks 552, 554, 562, 564, 572, 574, 582 and 584. Then, the controller 130 stores the data segments 512 in the first buffer 510, and provides the data segments 512 to the host 102.

Figure 6:
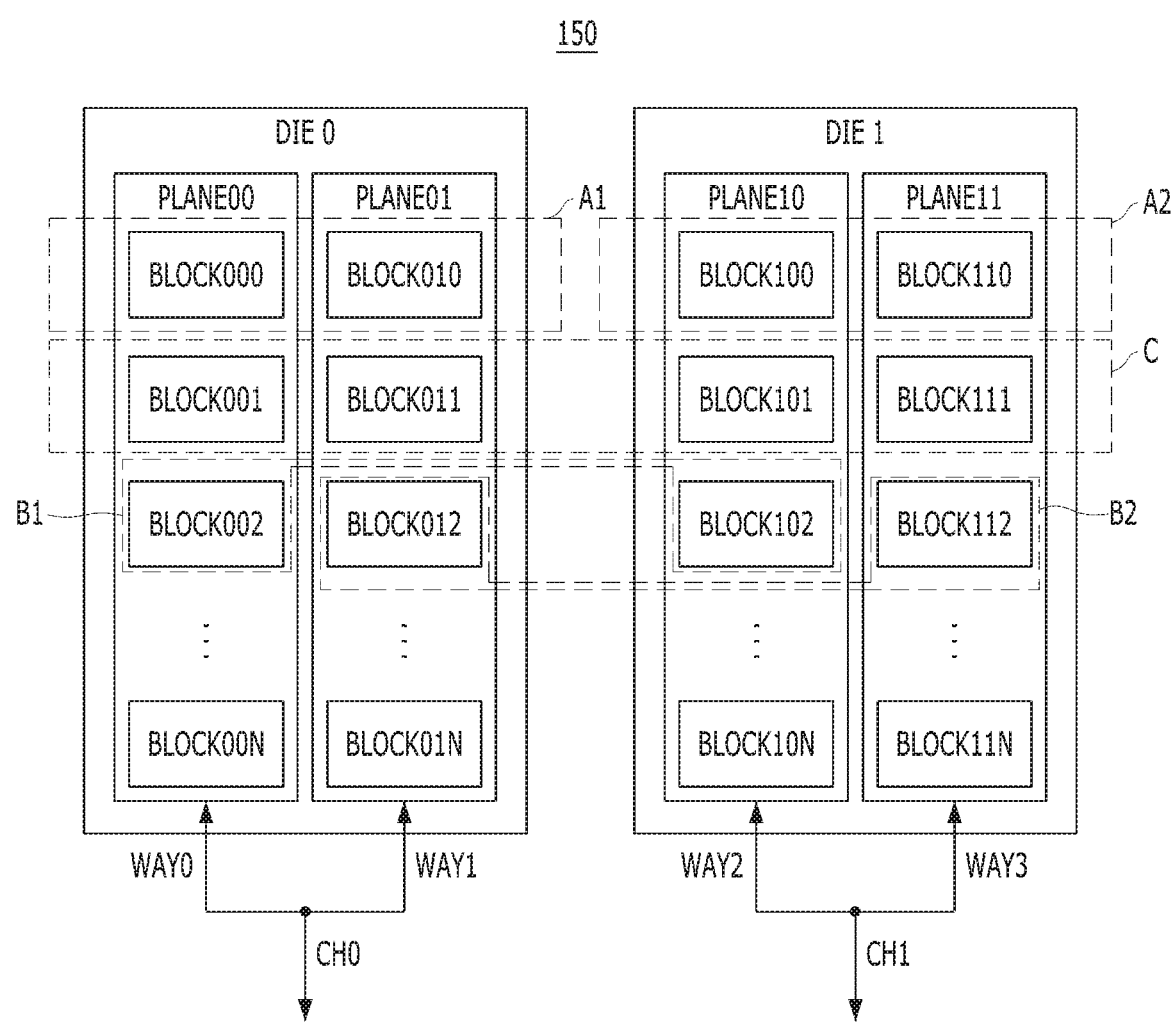
FIG. 6 is a diagram illustrating a super memory block used in a memory system in accordance with an embodiment.

FIG. 6 is a diagram illustrating a super memory block used in a memory system in accordance with an embodiment.

Referring to FIG. 6, the memory device 150 includes multiple dies, each with multiple planes, each with multiple blocks, arranged in accordance with an embodiment of the present disclosure.

The memory device 150 includes a plurality of memory blocks BLOCK000, BLOCK001, BLOCK002, . . . and BLCOK00N, BLOCK010, BLOCK011, BLOCK012, . . . and BLOCK01N, BLOCK100, BLOCK101, BLOCK102, . . . and BLCOK10N, and BLOCK110, BLOCK111, BLOCK112, . . . and BLOCK11N.

The memory device 150 includes a zeroth memory die DIE0 capable of inputting/outputting data from/to the controller 130 through a zeroth channel CH0 and a first memory die DIE1 capable of inputting/outputting data from/to the controller 130 through a first channel CH1. The zeroth channel CH0 and the first channel CH1 may input/output data in an interleaving scheme.

The zeroth memory die DE0 includes a plurality of planes, e.g., PLANE00 and PLANE01, respectively corresponding to a plurality of ways, e.g., WAY0 and WAY1, capable of inputting/outputting data in the interleaving scheme by sharing the zeroth channel CH0.

The first memory die DIE1 includes a plurality of planes, e.g., PLANE10 and PLANE11, respectively corresponding to a plurality of ways, e.g., WAY2 and WAY3, capable of inputting/outputting data in the interleaving scheme by sharing the first channel CH1.

The first plane PLANE00 of the zeroth memory die DIE0 includes a set number of memory blocks, e.g., BLOCK000, BLOCK001, BLOCK002, . . . and BLOCK00N among the plurality of memory blocks.

The second plane PLANE01 of the zeroth memory die DIE0 includes a set number of memory blocks, e.g., BLOCK010, BLOCK011, BLOCK012, . . . and BLOCK01N among the plurality of memory blocks.

The first plane PLANE10 of the first memory die DIE1 includes a set number of memory blocks, e.g., BLOCK100, BLOCK101, BLOCK102, . . . and BLOCK10N among the plurality of memory blocks.

The second plane PLANE11 of the first memory die DIE1 includes a set number of memory blocks, e.g., BLOCK110, BLOCK111, BLOCK112, . . . and BLOCK11N among the plurality of memory blocks.

In this manner, the plurality of memory blocks BLOCK000, BLOCK001, BLOCK002, . . . and BLOCK00N, BLOCK010, BLOCK011, BLOCK012, . . . and BLOCK01N, BLOCK100, BLOCK101, BLOCK102, . . . and BLOCK10N, and BLOCK110, BLOCK111, BLOCK112, . . . and BLOCK11N in the memory device 150 may be divided according to physical positions such as of using the same ways or the same channels.

The specific arrangement illustrated in FIG. 6, that is, two memory dies DIE0 and DIE1, each with two planes PLANE00 and PLANE01/PLANE10 and PLANE11, respectively is merely an example. The memory device 150 may include a different number of dies, and each die may include a different number of planes. Of course, the number of memory blocks in each plane may be adjusted variously according to a designer's choice or application requirements.

Also, instead of dividing the plurality of memory blocks according to physical positions, the controller 130 may use a scheme of dividing a plurality of memory blocks according to simultaneous selection and operation of memory blocks. That is to say, the controller 130 may manage a plurality of memory blocks which are divided into different dies or different planes by grouping memory blocks according to which are capable of being selected simultaneously and thereby dividing the plurality of memory blocks into super memory blocks.

Grouping, in this manner, the plurality of memory blocks into super memory blocks by the controller 130 may be accomplished through various schemes, three of which are described herein.

A first scheme, executed by the controller 130, is to manage one super memory block A1 by grouping one memory block BLOCK000 in the first plane PLANE00 and one memory block BLOCK010 in the second plane PLANE01 of the zeroth memory die DIE0. When applying the first scheme to the first memory die DIE1, the controller 130 may manage one super memory block A2 by grouping one memory block BLOCK100 in the first plane PLANE10 and one memory block BLOCK110 in the second plane PLANE11 of the first memory die DIE1.

A second scheme, executed by the controller 130, is to manage one super memory block 31 by grouping one memory block BLOCK002 in the first plane PLANE00 of the zeroth memory die DIE0 and one memory block BLOCK102 in the first plane PLANE10 of the first memory die DIE1. When applying the second scheme again, the controller 130 may manage one super memory block B2 by grouping one memory block BLOCK012 in the second plane PLANE01 of the zeroth memory die DIE0 and one memory block BLOCK112 in the second plane PLANE11 of the first memory die DIE1.

A third scheme, executed by the controller 130, is to manage one super memory block C by grouping one memory block BLOCK001 in the first plane PLANE00 of the zeroth memory die DIE0, one memory block BLOCK011 in the second plane PLANE01 of the zeroth memory die DIE0, one memory block BLOCK101 in the first plane PLANE10 of the first memory die DIE1 and one memory block BLOCK111 in the second plane PLANE11 of the first memory die DIE1.

As described above, memory blocks included in a super memory block may be selected at substantially the same time or simultaneously through an interleaving scheme, for example, a channel interleaving scheme, a memory die interleaving scheme, a memory chip interleaving scheme or a way interleaving scheme.

Figure 7:
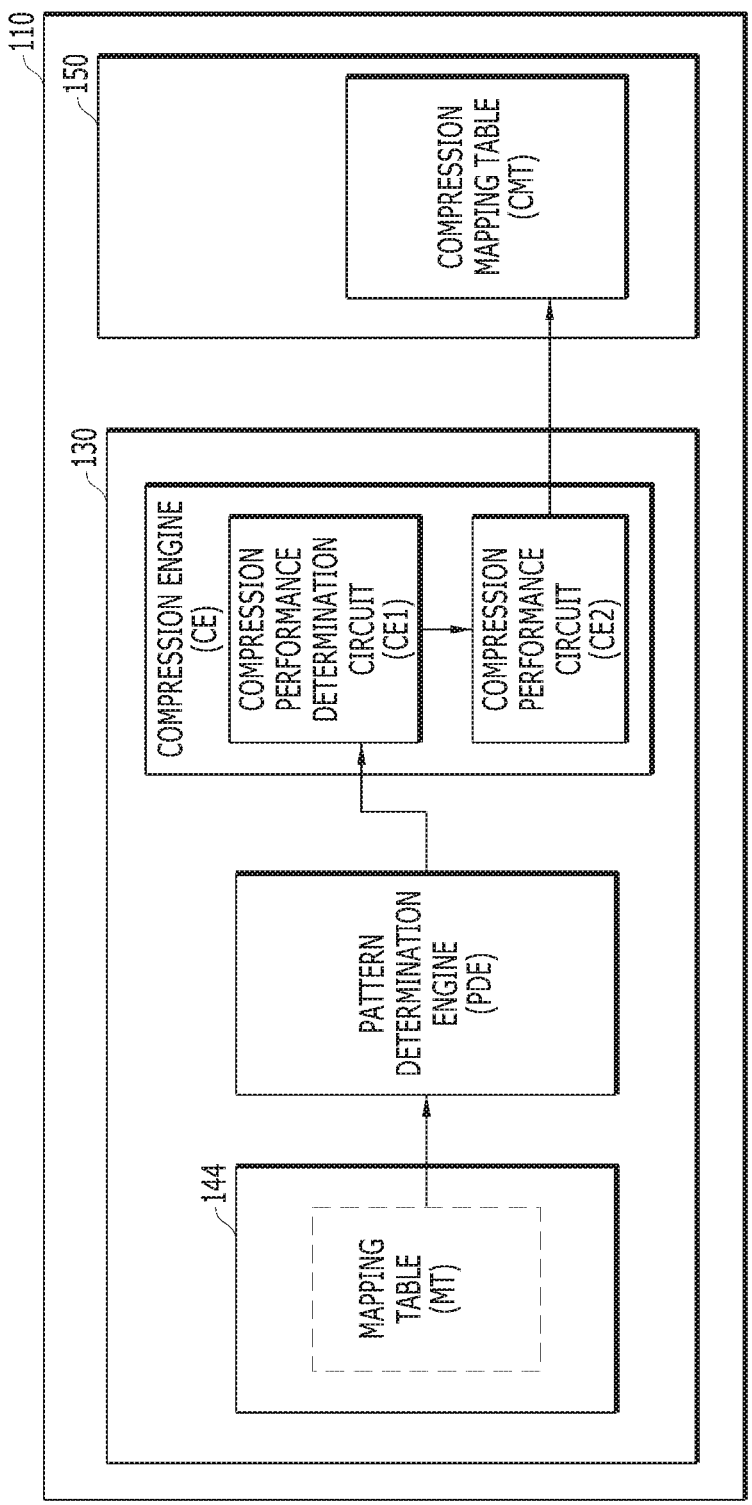
FIG. 7 is a diagram illustrating a method for operating a memory system which performs compression for mapping table (MT), in accordance with an embodiment of the present disclosure.

FIG. 7 is a diagram illustrating a method for operating a memory system which performs compression for data in a mapping table (MT), in accordance with an embodiment of the present disclosure. FIG. 8 is a diagram illustrating a mapping table included in a memory in accordance with an embodiment of the present disclosure, for example, the memory of FIG. 7. FIG. 9 is a diagram illustrating a compressed mapping table included in a memory device in accordance with an embodiment of the present disclosure, for example, the memory device 150 of FIG. 7.

Referring to FIG. 7, the memory system 110 may allow the controller 130 to perform an operation of compressing a data in a mapping table MT in which a plurality of map data are temporarily stored, and then programming and storing compressed map data in the memory device 150. The memory system 110 includes the controller 130 and the memory device 150. The controller 130 includes the memory 144, a pattern determination engine PDE and a compression engine CE. Although not illustrated in FIG. 7 for clarity, the controller 130 may also include, as shown in FIG. 1, the host interface 132, the processor 134, the ECC component 138, the power management unit 140 and the memory interface 142.

Referring to FIGS. 7 and 8, the memory 144 may include the mapping table MT. The mapping table MT may include a plurality of map segments S<1:n>. For instance, the plurality of map segments may include a first map segment S<1>, a second map segment S<2> and a third map segment S<3>. Each map segment may include a plurality of map chunks MC<1:n>, each of which is a unit or chunk of a set size. For instance, the first map segment S<1> may include a first map chunk MC<1>, a second map chunk MC<2> and a third map chunk MC<3>. The second map segment S<2> may include a fourth map chunk MC<4>, a fifth map chunk MC<5> and a sixth map chunk MC<6>. The third map segment S<3> may include a seventh map chunk MC<7>, an eighth map chunk MC<8> and a ninth map chunk MC<9>. Each of the map chunks MC<1:n> may include map data corresponding to a command operation. For instance, in the first map segment S<1>, the first map chunk MC<1> may include first map data, the second map chunk MC<2> may include second map data, and the third map chunk MC<3> may include third map data. In the second map segment S<2>, the fourth map chunk MC<4> may include fourth map data, the fifth map chunk MC<5> may include fifth map data, and the sixth map chunk MC<6> may include sixth map data. In the third map segment S<3>, the seventh map chunk MC<7> may include seventh map data, the eighth map chunk MC<8> may include eighth map data, and the ninth map chunk MC<9> may include ninth map data.

The pattern determination engine PDE determines a pattern of each map chunk based on the map data stored in each map chunk in the mapping table MT. That is, the pattern determination engine PDE determines whether the map data stored in each of the plurality of map chunks received from the memory 144 corresponds to random data, sequential data or empty regions with no map data. For instance, the first map chunk MC<1>, the fifth map chunk MC<5> and the ninth map chunk MC<9> may include map data corresponding to random data. The second to fourth map chunks MC<2> to MC<4> and the eighth map chunk MC<8> may include map data corresponding to sequential data. The sixth map chunk MC<6> and the seventh map chunk MC<7> may correspond to empty regions. The pattern determination engine PDE transfers a pattern determination result, for each map chunk, to the compression engine CE.

The compression engine CE may include a compression performance determination circuit CE1 and a compression performance circuit CE2, The compression performance determination circuit CE1 receives a pattern determination result for the map data stored in each map chunk from the pattern determination engine PDE. The compression performance determination circuit CE1 determines whether to perform compression, depending on the pattern determination result, and thereby determines whether each map chunk is compressible or incompressible. The compression performance determination circuit CE1 transfers a compression performance determination result to the compression performance circuit CE2.

The compression performance circuit CE2 receives a compression performance determination result from the compression performance determination circuit CE1. The compression performance circuit CE2 performs compression to a given map chunk by applying a compression rate that depends on the pattern of that map chunk. Then, the compression performance circuit CE2 programs and stores resultant map data in a compression mapping table CMT of the memory device 150.

For instance, the compression performance circuit CE2 may apply a compression rate of 0% in the case where the pattern of the map data stored in a map chunk is random data. The compression performance circuit CE2 may compress a map chunk by applying a compression rate of 50% in the case where the pattern of the map data stored in a map chunk is sequential data. The compression performance circuit CE2 may compress a map chunk by applying a compression rate of 25% in the case where a map chunk includes an empty region. It is to be noted that the compression rates applied to map chunks are not specifically limited to the examples given above. For instance, because the first map chunk MC<1>, the fifth map chunk MC<5> and the ninth map chunk MC<9> include map data as random data, the compression performance circuit CE2 may not compress the first map chunk MC<1>, the fifth map chunk MC<5> and the ninth map chunk MC<9>, which means that the applied compression rate is 0%. On the other hand, because the second to fourth map chunks MC<2> to MC<4> and the eighth map chunk MC<8> include map data as sequential data, the compression performance circuit CE2 may compress the second to fourth map chunks MC<2> to MC<4> and the eighth map chunk MC<8> into second to fourth compressed map chunks and an eighth compressed map chunk by applying a compression rate of 50%. Further, because the sixth and seventh map chunks MC<6> to MC<7> include empty regions, the compression performance circuit CE2 may compress the sixth and seventh map chunks MC<6> to MC<7> into sixth and seventh compressed map chunks by applying a compression rate of 25%. The controller 130 may program and store each compressed map chunk compressed through the compression engine CE, as well as each uncompressed map chunk in the compression mapping table CMT which is included in the memory device 150. The configuration of the compression mapping table CMT of FIG. 7 will be described with reference to FIG. 9.

Referring to FIG. 9, the compression mapping table CMT is maintained for a plurality of pages included in a super page. The compression mapping table CMT may include a map chunk count field and a compress map chunk list. In the map chunk count field, there is recorded a count that represents the number of uncompressed map chunks and compressed map chunks included in the compress map chunk list for a given page. Each time an uncompressed map chunk or a compressed map chunk is stored in the compress map chunk list, the corresponding map chunk count may be updated. In the compress map chunk list, only one uncompressed map chunk which is not compressed may be stored in one page, and a plurality of compressed map chunks which are compressed may be stored in one page. For instance, the compression mapping table CMT may include a first page to a sixth page. In the first page, the first uncompressed map chunk (IC_MC<1>) which is not compressed is stored, and '1' as the count of the map chunk stored in the first page is recorded. In the second page, the second compressed map chunk (C_MC<2>) and the third compressed map chunk (C_MC<3>) which are compressed to 50% are stored, and '2' as the count of the map chunks stored in the second page is recorded. In the third page, the fourth compressed map chunk (C_MC<4>) which is compressed to 50% and a dummy (Dummy) are stored. The reason why the dummy is stored in the third page is because a map chunk to be stored next to the fourth compressed map chunk (C_MC<4>) is the fifth uncompressed map chunk (IC_MC<5>) which includes map data as random data. Therefore, since the fifth uncompressed map chunk cannot be stored in the third page, the dummy is stored. '1' as the count of the map chunk stored in the third page is recorded. In the fourth page, the fifth uncompressed map chunk (IC_MC<5>) is stored, and '1' as the count of the map chunk stored in the fourth page is recorded. In the fifth page, the sixth and seventh compressed map chunks (C_MC<6>, and C_MC<7>) which are compressed to 25% and the eighth map chunk (C_MC<8>) which is compressed to 50% are stored, and '3' as the count of the map chunks stored in the fifth page is recorded. In the sixth page, the ninth uncompressed map chunk (IC_MC<9>) which is not compressed is stored, and '1' as the count of the map chunk stored in the sixth page is recorded. In this way, by programming and storing map data through compressing the data in the mapping table MT, it is possible to manage the mapping table MT by a smaller unit.

Figure 10:
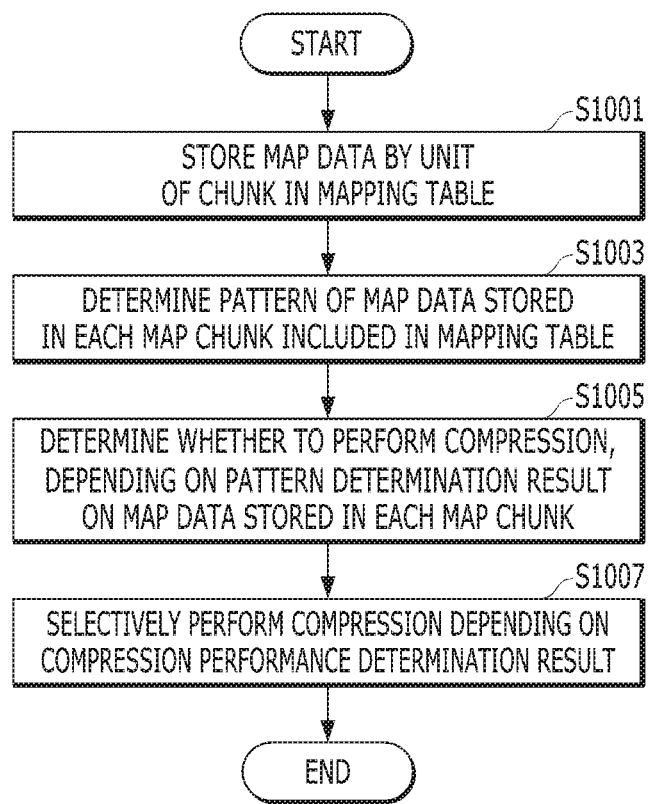
FIG. 10 is a flow chart illustrating a method for operating a memory system in accordance with an embodiment.

FIG. 10 is a flow chart illustrating a method for operating a memory system in accordance with an embodiment. The method of FIG. 10 will be described with additional reference to FIGS. 5 to 9.

Referring to FIG. 10, at step S1001, a controller 130 may store a plurality of map data in a mapping table MT included in a memory 144. As shown in FIG. 8, the mapping table MT may include the plurality of map segments S<6: n>. For instance, the plurality of map segments may include a first map segment Segment_1 S<1>, a second map segment Segment_S<2> and a third map segment Segment_3 S<3>. Each map segment may include a plurality of map chunks MC<1:n>, each of which is a unit or chunk of a set size. For instance, the first map segment Segment_1 S<1> may include a first map chunk MC<1>, a second map chunk MC<2> and a third map chunk MC<3>. The second map segment Segment_2 S<2> may include a fourth map chunk MC<4>, a fifth map chunk MC<5> and a sixth map chunk MC<6>. The third map segment Segment_3 S<3> may include a seventh map chunk MC<7>, an eighth map chunk MC<8> and a ninth map chunk MC<9>. Each of the map chunks MC<1:n> may include map data corresponding to a command operation. For instance, in the first map segment S<1>, the first map chunk MC<1> may include first map data, the second map chunk MC<2> may include second map data, and the third map chunk MC<3> may include third map data. In the second map segment S<2>, the fourth map chunk MC<4> may include fourth map data, the fifth map chunk MC<5> may include fifth map data, and the sixth map chunk MC<6> may include sixth map data. In the third map segment S<3>, the seventh map chunk MC<7> may include seventh map data, the eighth map chunk MC<8> may include eighth map data, and the ninth map chunk MC<9> may include ninth map data.

At step S1003, the controller 130 determines the pattern of map data stored in each of the map chunks in the mapping table MT. That is, the controller 130 determines whether the map data stored in each of the map chunk is map data corresponding to random data, map data corresponding to sequential data or empty region(s) with no map data. As a result of the determinations, the first map chunk MC<1>, the fifth map chunk MC<5> and the ninth map chunk MC<9> may include map data as random data, the second to fourth map chunks MC<2> to MC<4> and the eighth map chunk MC<8> may include map data as sequential data, and the sixth map chunk MC<6> and the seventh map chunk MC<7> may include empty regions.

At step S1005, the controller 130 determines whether to perform compression, depending on the pattern determination result of the step S1003 for the map data stored in each map chunk.

At step S1007, the controller 130 performs compression to different chunk units by applying different compression rates depending on the patterns of the map data stored in the map chunks, according to the results of determining whether to perform compression at the step S1005. For instance, the controller 130 may apply a compression rate of 0% in the case where the pattern of the map data stored in a map chunk is random data. The controller 130 may compress a map chunk size by applying a compression rate of 50% in the case where the pattern of the map data stored in a map chunk is sequential data. The controller 130 may compress a map chunk size by applying a compression rate of 25% in the case where a map chunk includes an empty region. It is to be noted that the compression rates given above are exemplary; other suitable compression rates may be used. For instance, because the first map chunk MC<1>, the fifth map chunk MC<5> and the ninth map chunk MC<9> include map data as random data, the controller 130 applies a low compression rate or does not compress such data at all, i.e., applies a compression rate of 0%. The first map chunk MC<1>, the fifth map chunk MC<5> and the ninth map chunk MC<9> which are not compressed are referred to as a first uncompressed map chunk IC_Map Chunk_1 (or IC_MC<1>), a fifth uncompressed map chunk IC_Map Chunk_5 (or IC_MC<5>) and a ninth uncompressed map chunk IC_Map Chunk_9 (or IC_MC<9>). On the other hand, because the second to fourth map chunks MC<2> to MC<4> and the eighth map chunk MC<8> include map data as sequential data, the controller 130 may perform compression by applying a relatively high compression rate, which in the illustrated embodiment is 50%. The compressed map chunks are referred to as second to fourth compressed map chunks C_Map Chunk_2 (or C_MC<2>) to C_Map Chunk_4 (or C_MC<4>) and an eighth compressed map chunk C_Map Chunk_8 (or C_MC<8>). Also, because the sixth map chunk MC<6> and the seventh map chunk MC<7> include empty region(s), the controller 130 may perform compression by applying a moderate compression rate of, e.g., 25%. The compressed map chunks are referred to as sixth and seventh compressed map chunks C_Map Chunk_6 (or C_MC<6>) and C_Map Chunk_7 (or C_MC<7>). The controller 130 may program and store the plurality of compressed map chunks and the plurality of uncompressed map chunks in a compression mapping table CMT which is included in a nonvolatile memory device 150. Since the compression mapping table CMT is described above in detail with reference to FIG. 9, further description thereof is omitted here.

With reference to FIGS. 11 to 19, a data processing system and electronic appliances, to which the memory system 110 including the memory device 150 and the controller 130 described above, may be applied, in accordance with embodiments, are described.

Figure 11:
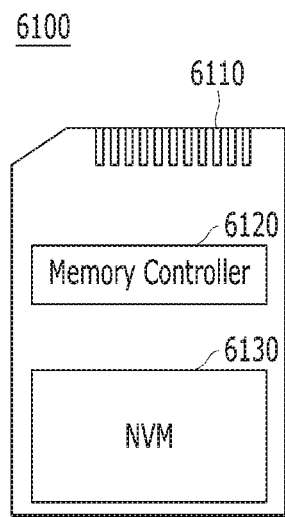
FIGS. 11 to 19 are diagrams illustrating examples of memory systems in accordance with embodiments.

FIG. 11 is a diagram illustrating a data processing system including a memory system in accordance with an embodiment. FIG. 11 illustrates a memory card system 6100 to which the memory system is applied.

Referring to FIG. 11, the memory card system 6100 includes a connector 6110, a memory controller 6120 and a memory device 6130.

The memory controller 6120 is connected with, for access to, the memory device 6130, which is implemented as a nonvolatile memory (NVM. For example, the memory controller 6120 controls the read, write, erase and background operations of the memory device 6130. The memory controller 6120 provides an interface between the memory device 6130 and a host (not shown), and drives firmware for controlling the memory device 6130. That is to say, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processor, a host interface, a memory interface and an error correction component.

The memory controller 6120 may communicate with an external device, for example, the host 102 described above with reference to FIG. 1, through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), advanced technology attachment (ATA), serial ATA, parallel ATA, small computer system interface (SCSI), enhanced small disk interface (ESDI), integrated drive electronics (IDE), Firewire, universal flash storage (UFS), WiFi or Wi-Fi and Bluetooth. Accordingly, the memory system and the data processing system in accordance with an embodiment may be applied to wired and/or wireless electronic appliances, particularly a mobile electronic appliance.

The memory device 6130 may be implemented by a nonvolatile memory such as an electrically erasable and programmable ROM (EPROM), a NAND flash memory, a NOR flash memory, a phase-change RAM (PRAM), a resistive RAM (ReRAM), a ferroelectric RAM (FRAM) and/or a spin torque transfer magnetic RAM (STT-MRAM).

The controller 6120 and the memory device 6130 may be integrated into one semiconductor device to form a solid state drive (SSD), or a memory card such as a PC card (e.g., personal computer memory card international association (PCMCIA)), a compact flash card (CF), a smart media card (e.g., SM and SMC), a memory stick, a multimedia card (e.g., MMC, RS-MMC, MMCmicro and eMMC), a secure digital (SD) card (e.g., SD, miniSD, microSD and SDHC) or a universal flash storage (UFS).

Figure 12:
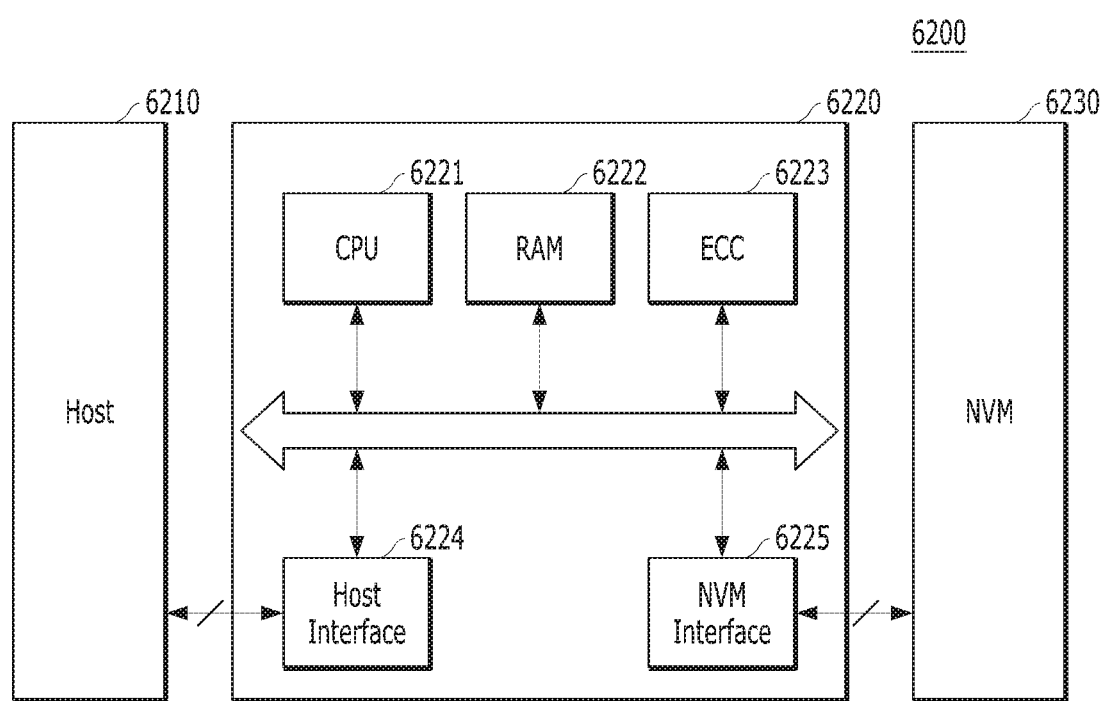

FIG. 12 is a diagram illustrating a data processing system 6200 including a memory system in accordance with an embodiment.

Referring to FIG. 12, the data processing system 6200 includes a memory device 6230 which is implemented by at least one nonvolatile memory (NVM) and a memory controller 6220 which controls the memory device 6230. The data processing system 6200 may be a storage medium such as a memory card (e.g., CF, SD and microSD). The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 controls read, write and erase operations for the memory device 6230 in response to requests from a host 6210. The memory controller 6220 includes at least one CPU 6221, a buffer memory, for example, a RAM 6222, an ECC circuit 6223, a host interface 6224, and a memory interface, for example, an NVM interface 6225.

The CPU 6221 may control general operations for the memory device 6230, for example, read, write, file system management, bad page management, and the like. The RAM 6222 operates according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 of a low speed to operate at a high speed.

The ECC circuit 6223 corresponds to the ECC component 138 of the controller 130 described above with reference to FIG. 1. As described above with reference to FIG. 1, the ECC circuit 6223 generates an error correction code (ECC) for correcting a failed bit or an error bit in the data received from the memory device 6230. Also, the ECC circuit 6223 performs error correction encoding for data to be provided to the memory device 6230, and generates data with added parity bits. The parity bits may be stored in the memory device 6230. The ECC circuit 6223 may perform error correction decoding for data outputted from the memory device 6230. The ECC circuit 6223 may correct errors by using the parity bits. For example, as described above with reference to FIG. 1, the ECC circuit 6223 may correct errors by using various coded modulations such as an LDPC code, a BCH code, a turbo code, a Reed-Solomon code, a convolution code, an RSC, a TCM and a BCM.

The memory controller 6220 transmits and receives data to and from the host 6210 through the host interface 6224, and transmits and receives data to and from the memory device 6230 through the NVM interface 6225. The host interface 6224 may be connected with the host 6210 through a PATA bus, a SATA bus, an SCSI, a USB, a PCIe or a NAND interface. Further, as a wireless communication function or a mobile communication protocol such as WiFi or long term evolution (LTE) is implemented, the memory controller 6220 may transmit and receive data by being connected with an external device, for example, the host 6210 or another external device other than the host 6210. Specifically, as the memory controller 6220 is configured to communicate with an external device through at least one among various communication protocols, the memory system and the data processing system in accordance with an embodiment may be applied to wired and/or wireless electronic appliances, particularly a mobile electronic appliance.

Figure 13:
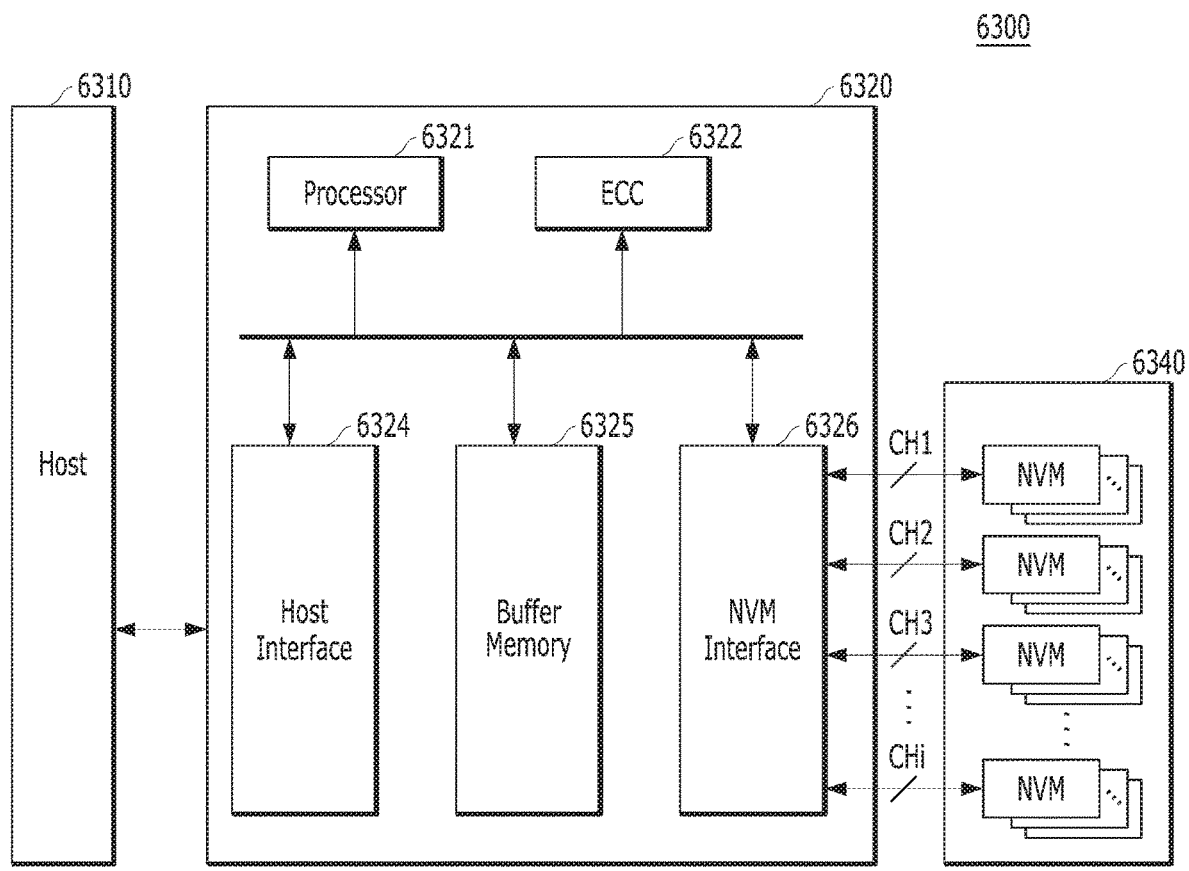

FIG. 13 is a diagram illustrating a data processing system including a memory system in accordance with an embodiment. FIG. 13 illustrates a solid state drive (SSD) 6300 to which the memory system is applied.

Referring to FIG. 13, the SSD 6300 includes a controller 6320 and a memory device 6340 which includes a plurality of nonvolatile memories (NVM). The controller 6320 may correspond to the controller 130 in the memory system 110 described above with reference to FIG. 1, and the memory device 6340 may correspond to the memory device 150 in the memory system 110 described above with reference to FIG. 1.

The controller 6320 is connected with the memory device 6340 through a plurality of channels CH1, CH2, CH3, . . . and CHi. The controller 6320 includes at least one processor 6321, an ECC circuit 6322, a host interface 6324, a buffer memory 6325, and a memory interface, for example, a nonvolatile memory interface 6326.

The buffer memory 6325 temporarily stores data received from a host 6310 or data received from a plurality of flash memories NVMs included in the memory device 6340, or temporarily stores metadata of the plurality of flash memories NVMs, for example, map data including mapping tables. The buffer memory 6325 may be realized by a volatile memory such as, but not limited to, a DRAM, an SDRAM, a DDR SDRAM, an LPDDR SDRAM and a GRAM or a nonvolatile memory such as, but not limited to, an FRAM, an ReRAM, an STT-MRAM and a PRAM. While it is illustrated in FIG. 13 that the buffer memory 6325 is disposed inside the controller 6320, the buffer memory 6325 may be disposed external to the controller 6320.

The ECC circuit 6322 calculates error correction code values of data to be programmed in the memory device 6340 in a program operation. The ECC circuit 6322 performs an error correction operation for data read from the memory device 6340, based on the error correction code values, in a read operation. The ECC circuit 6322 performs an error correction operation for data recovered from the memory device 6340 in a recovery operation for failed data.

The host interface 6324 provides an interface function with respect to an external device, for example, the host 6310, and the nonvolatile memory interface 6326 provides an interface function with respect to the memory device 6340 which is connected through the plurality of channels CH1, CH2, CH3, . . . and CHi.

As a plurality of SSDs 6300 to each of which the memory system 110 described above with reference to FIG. 1 is applied are used, a data processing system, for example, a redundant array of independent disks (RAID) system may be implemented. In the RAID system, the plurality of SSDs 6300 and a RAID controller for controlling the plurality of SSDs 6300 may be included. In the case of performing a program operation by receiving a write command from the host 6310, the RAID controller may select at least one memory system, that is, at least one SSD 6300, in correspondence to the RAID level information of the received write command received, among a plurality of RAID levels, that is, the plurality of SSDs 6300, and may output data corresponding to the write command to the selected SSD 6300. Also, in the case of performing a read operation by receiving a read command from the host 6310, the RAID controller may select at least one memory system, that is, at least one SSD 6300, in correspondence to the RAID level information of the received read command, among the plurality of RAID levels, that is, the plurality of SSDs 6300, and may provide data outputted from the selected SSD 6300 to the host 6310.

Figure 14:
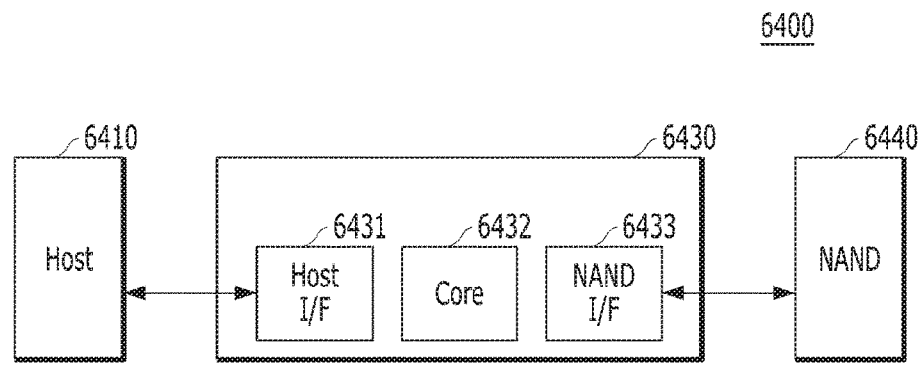

FIG. 14 is a diagram illustrating a data processing system including a memory system in accordance with an embodiment. FIG. 14 illustrates an embedded multimedia card (eMMC) 6400 to which the memory system is applied.

Referring to FIG. 14, the eMMC 6400 includes a controller 6430 and a memory device 6440 which is implemented by at least one NAND flash memory. The controller 6430 may correspond to the controller 130 in the memory system 110 described above with reference to FIG. 1, and the memory device 6440 may correspond to the memory device 150 in the memory system 110 described above with reference to FIG. 1.

The controller 6430 is connected with the memory device 6440 through a plurality of channels. The controller 6430 includes at least one core 6432, a host interface (I/F) 6431, and a memory interface, i.e., a NAND interface (I/F) 6433.

The core 6432 controls general operations of the eMMC 6400. The host interface 6431 provides an interface function between the controller 6430 and a host 6410. The NAND interface 6433 provides an interface function between the memory device 6440 and the controller 6430. For example, the host interface 6431 may be a parallel interface, for example, an MMC interface, as described above with reference to FIG. 1, and may be a serial interface, for example, an ultra high speed (UHS)-I/UHS-II and a UFS interface.

FIGS. 15 to 18 are diagrams illustrating examples of data processing systems including a memory system in accordance with embodiments. Each of FIGS. 15 to 18 illustrates a universal flash storage (UFS) to which the memory system is applied.

Referring to FIGS. 15 to 18, respective UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The respective hosts 6510, 6610, 6710 and 6810 may be wired and/or wireless electronic appliances, in particular, application processors of mobile electronic appliances or the likes. The respective UFS devices 6520, 6620, 6720 and 6820 may be embedded UFS devices. The respective UFS cards 6530, 6630, 6730 and 6830 may be external embedded UFS devices or removable UFS cards.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with external devices, for example, wired and/or wireless electronic appliances, in particular, mobile electronic appliances or the likes, through UFS protocols. The UFS devices 6520, 6620, 6720 and 6820 and the UFS cards 6530, 6630, 6730 and 6830 may be implemented as the memory system 110 described above with reference to FIG. 1. For example, in the respective UFS systems 6500, 6600, 6700 and 6800, the UFS devices 6520, 6620, 6720 and 6820 may be implemented in the form of the data processing system 6200, the SSD 6300 or the eMMC 6400 described above with reference to FIGS. 12 to 14, and the UFS cards 6530, 6630, 6730 and 6830 may be implemented in the form of the memory card system 6100 described above with reference to FIG. 11.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may perform communication through the universal flash storage (UFS) interface, for example, MIPI M-PHY and MIPI Unified Protocol (UniPro) in Mobile Industry Processor Interface (MIPI). The UFS devices 6520, 6620, 6720 and 6820 and the UFS cards 6530, 6630, 6730 and 6830 may perform communication through another protocol other than the UFS protocol, for example, various card protocols such as universal storage bus (USB) Flash Drives (UFDs), multi-media card (MMC), secure digital (SD), mini SD and Micro SD.

Figure 15:
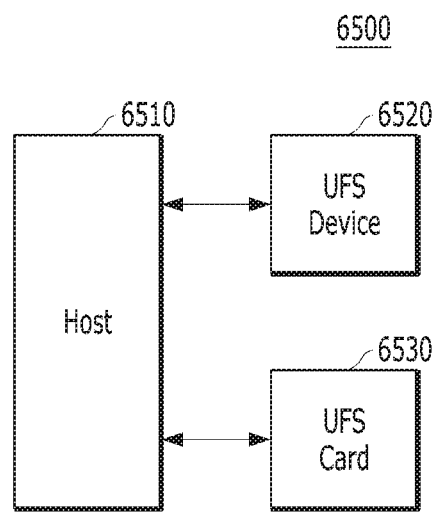

In the UFS system 6500 shown in FIG. 15, UniPro exists in each of the host 6510, the UFS device 6520 and the UFS card 6530. The host 6510 performs a switching operation to perform communication with each of the UFS device 6520 and the UFS card 6530. In particular, the host 6510 performs communication with the UFS device 6520 or the UFS card 6530, through link layer switching in UniPro, for example, L3 switching. The UFS device 6520 and the UFS card 6530 may perform communication through link layer switching in the UniPro of the host 6510. While it is described as an example that one UFS device 6520 and one UFS card 6530 are coupled to the host 6510, it is noted that a plurality of UFS devices and a plurality of UFS cards may be coupled to the host 6510 in a parallel or a star type arrangement. Also, a plurality of UFS cards may be coupled to the UFS device 6520 in any of a parallel, a star, a serial or a chain type arrangement.

Figure 16:
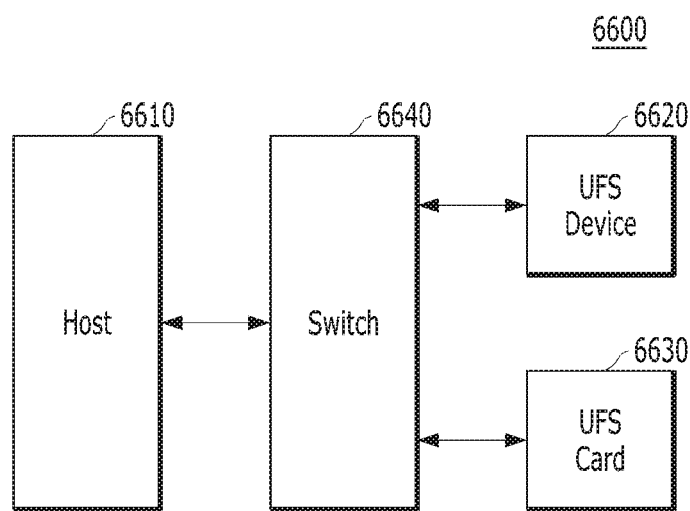

In the UFS system 6600 shown in FIG. 16, UniPro exists in each of the host 6610, the UFS device 6620 and the UFS card 6630. The host 6610 performs communication with the UFS device 6620 or the UFS card 6630 through a switching module 6640 which performs a switching operation, in particular, a switching module 6640 which performs link layer switching in UniPro, for example, an L3 switching operation. The UFS device 6620 and the UFS card 6630 may perform communication through link layer switching in the UniPro of the switching module 6640. While it is described as an example that one UFS device 6620 and one UFS card 6630 are coupled to the switching module 6640, it is noted that a plurality of UFS devices and a plurality of UFS cards may be coupled to the switching module 6640 in a parallel type or a star type arrangement. Also, a plurality of UFS cards may be coupled to the UFS device 6620 in any of a parallel, a star, a serial or a chain type arrangement.

Figure 17:
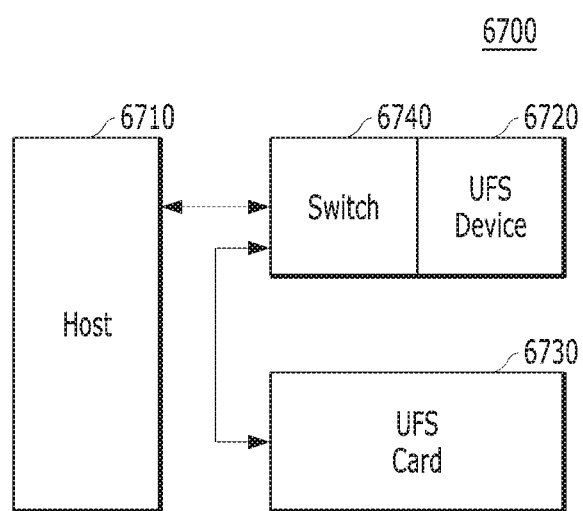

In the UFS system 6700 shown in FIG. 17, UniPro exists in each of the host 6710, the UFS device 6720 and the UFS card 6730. The host 6710 performs communication with the UFS device 6720 or the UFS card 6730 through a switching module 6740 which performs a switching operation, in particular, the switching module 6740 which performs link layer switching in UniPro, for example, an L3 switching operation. The UFS device 6720 and the UFS card 6730 may perform communication through link layer switching in the UniPro of the switching module 6740. The switching module 6740 may be implemented as one module with the UFS device 6720 inside or outside the UFS device 6720. While it is described as an example that one UFS device 6720 and one UFS card 6730 are coupled to the switching module 6740, it is noted that a plurality of modules in which the switching module 6740 and the UFS device 6720 are respectively implemented may be coupled to the host 6710 in a parallel type or a star type arrangement. Also, respective modules may be coupled in a serial type or a chain type arrangement, or a plurality of UFS cards may be coupled to the switching module 6740 in a parallel type or a star type arrangement.

Figure 18:
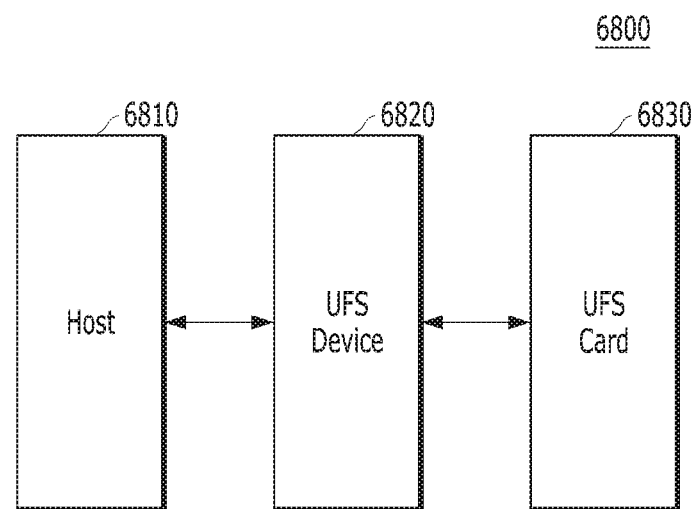

In the UFS system 6800 shown in FIG. 18, M-PHY and UniPro exist in each of the host 6810, the UFS device 6820 and the UFS card 6830. The UFS device 6820 performs a switching operation to perform communication with the host 6810 and the UFS card 6830. In particular, the UFS device 6820 performs communication with the host 6810 or the UFS card 6830, through switching between M-PHY and UniPro modules for communication with the host 6810 and M-PHY and UniPro modules for communication with the UFS card 6830, for example, target identifier (ID) switching. The host 6810 and the UFS card 6830 may perform communication through target ID switching between M-PHY and UniPro modules of the UFS device 6820. While it is described as an example that one UFS device 6820 is coupled to the host 6810 and one UFS card 6830 is coupled to one UFS device 6820, it is noted that a plurality of UFS devices may be coupled to the host 6810 in a parallel type or a star type arrangement. Also, a plurality of UFS cards may be coupled to one UFS device 6820 in any of a parallel, a star, a serial, or a chain type arrangement.

Figure 19:
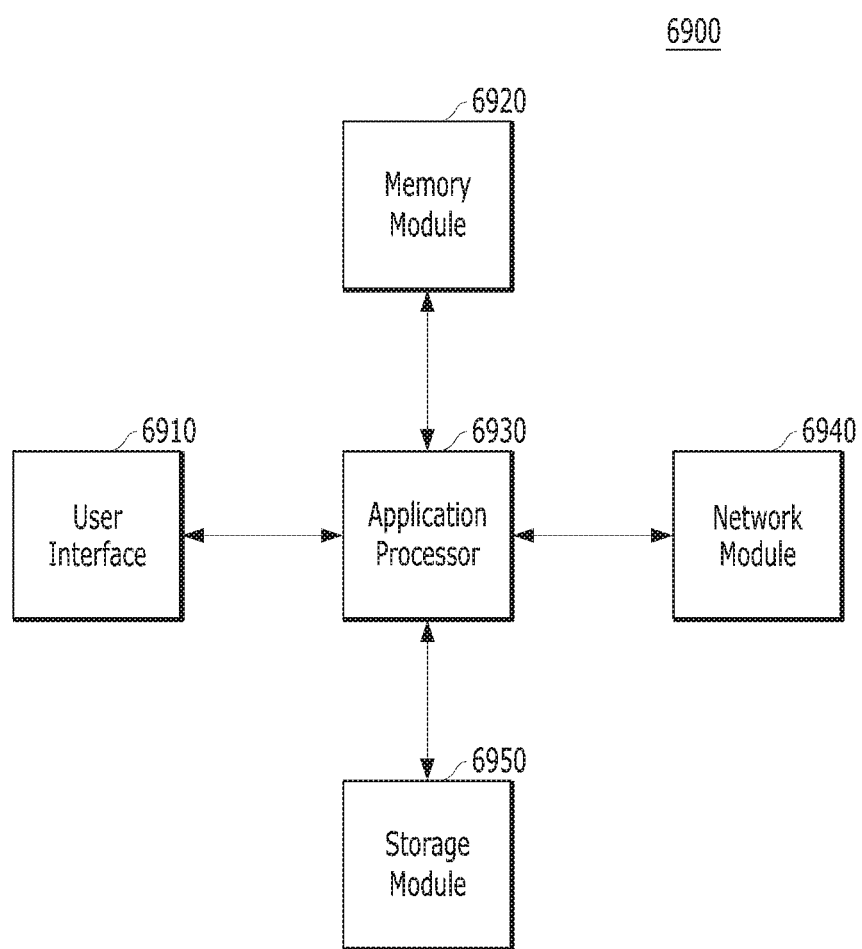

FIG. 19 is a diagram illustrating a data processing system including a memory system in accordance with an embodiment. FIG. 19 illustrates a user system 6900 to which the memory system is applied.

Referring to FIG. 19, the user system 6900 includes a user interface 6910, a memory module 6920, an application processor 6930, a network module 6940, and a storage module 6950.

The application processor 6930 drives components included in the user system 6900 and an operating system (OS). For example, the application processor 6930 may include controllers for controlling the components included in the user system 6900, interfaces, graphics engines, and so on. The application processor 6930 may be provided by a system-on-chip (SoC).

The memory module 6920 may operate as a main memory, a working memory, a buffer memory or a cache memory of the user system 6900. The memory module 6920 may include a volatile random access memory such as a DRAM, an SDRAM, a DDR SDRAM, a DDR2 SDRAM, a DDR3 SDRAM, an LPDDR SDRAM, an LPDDR2 SDRAM and an LPDDR3 SDRAM or a nonvolatile random access memory such as a PRAM, an ReRAM, an MRAM and an FRAM. For example, the application processor 6930 and the memory module 6920 may be mounted by being packaged on the basis of a package-on-package (PoP).

The network module 6940 may communicate with external devices. For example, the network module 6940 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), and the like, and may thereby communicate with wired and/or wireless electronic appliances, particularly a mobile electronic appliance. According to this fact, the memory system and the data processing system may be applied to wired and/or wireless electronic appliances. The network module 6940 may be included in the application processor 6930.

The storage module 6950 may store data, for example, data received from the application processor 6930, and transmit data stored therein, to the application processor 6930. The storage module 6950 may be implemented by a nonvolatile memory such as a phase-change RAM (PRAM), a magnetic RAM (MRAM), a resistive RAM (ReRAM), a NAND flash memory, a NOR flash memory and a 3-dimensional NAND flash memory. Also, the storage module 6900 may be provided as a removable storage medium such as a memory card of the user system 6900 and an external drive. That is to say, the storage module 6950 may correspond to the memory system 110 described above with reference to FIG. 1, and may be implemented as the SSD, eMMC and UFS described above with reference to FIGS. 13 to 18.

The user interface 6910 may include interfaces for inputting data or commands to the application processor 6930 or for outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

In the case where the memory system 110 described above with reference to FIG. 1 is applied to the mobile electronic appliance of the user system 6900 in accordance with an embodiment, the application processor 6930 controls general operations of the mobile electronic appliance, and the network module 6940 as a communication module controls wired and/or wireless communication with an external device, as described above. The user interface 6910 as the display and touch module of the mobile electronic appliance displays data processed by the application processor 6930 or supports input of data from a touch panel.

In accordance with embodiments of the present invention, by selectively compressing map data depending on the pattern of the map data, it is possible to efficiently manage map data.

Although various embodiments have been described and illustrated, it will be apparent to those skilled in the art in light of the present disclosure that various changes and modifications may be made without departing from the spirit and scope of the invention as defined in the following claims.

What is claimed is:

1. A memory system comprising:
    a memory device including dies, each of the dies including planes, each of the planes including blocks, each of the blocks including pages; and
    a controller suitable for controlling the memory device, the controller comprising:
    a memory including a mapping table which includes map chunks generated through dividing map data into map chunks each of a unit size;
    a pattern determination engine suitable for determining patterns with respect to whether map data in each of the map chunks received from the memory corresponds to random data, sequential data or an empty region; and
    a compression engine suitable for determining whether to perform compression on the map chunks, based on pattern determination results for the map chunks determined by the pattern determination engine, and performing compression on those map chunks for which performing compression was determined, with different compression rates for each of those map chunks,
    wherein the compression engine does not compress each map chunk in which data corresponds to random data, compresses each map chunk in which data corresponds to sequential data at a first compression rate, and compresses each map chunk in which data corresponds to an empty region at a second compression rate, based on results determined by the compression engine.

2. The memory system according to claim 1, wherein the memory device includes a mapping table.

3. The memory system according to claim 2, wherein the mapping table includes each map chunk and indication as to whether it was compressed or not.

4. The memory system according to claim 2, wherein the mapping table is constructed for pages of the memory device that form a super page, and includes a compress map chunk list and a map chunk count field, wherein, for each page of the super page, the compress map chunk list includes at least one compressed map chunk or uncompressed map chunk and the map chunk count field includes a map chunk count which indicates a count of compressed map chunks and uncompressed map chunks for the corresponding page.

5. A method for operating a memory system including a memory device including dies, each of the dies including planes, each of the planes including blocks, each of the blocks including pages, and a controller which controls the memory device, the method comprising:
    determining patterns with respect to whether map data in each of a plurality of map chunks in a mapping table corresponds to random data, sequential data or an empty region;
    determining whether to perform compression on the map chunks based on pattern determination results for the map chunks; and
    selectively performing compression on the map chunks based on compression determination results,
    wherein the selectively performing compression on the map chunks comprises:
    not compressing each map chunk in which data corresponds to random data; and
    compressing each map chunk in which data corresponds to sequential data at a first compression rate and compressing each map chunk in which data corresponds to an empty region at a second compression rate.

6. The method according to claim 5, wherein map data is divided into the chunks, each of which is of a unit size.

7. The method according to claim 6, wherein the memory device includes a mapping table.

8. The method according to claim 7, wherein the mapping table includes each map chunk and whether it was compressed or not.

9. The method according to claim 7, wherein the mapping table is constructed for pages of the memory device that form a super page, and includes a compress map chunk list and a map chunk count field, wherein, for each page of the super page the compress map chunk list includes at least one compressed map chunk or uncompressed map chunk and the map chunk count filed includes a map chunk count which indicates a count of compressed map chunks and uncompressed map chunks stored for the corresponding page.

10. A memory system comprising:
    a memory device; and
    a controller suitable for:
    dividing map data into chunks, each having a set size;
    detecting a pattern for map data in each of the chunks, wherein the pattern for map data is random data, sequential data or an empty region;
    determining whether to compress each chunk based on the detected pattern for the map data of that chunk;

determining a compression rate for each chunk for which it was determined to compress;

compressing each chunk for which it was determined to compress at the compression rate determined for that chunk; and controlling the memory device to store the compressed chunks of map data, wherein the controller does not compress each map chunk in which data corresponds to random data, compresses each map chunk in which data corresponds to sequential data at a first compression rate, and compresses each map chunk in which data corresponds to an empty region at a second compression rate, based on results determined by the compression performance.

* * * * *